United States Patent
Xiao

(10) Patent No.: US 12,479,663 B2
(45) Date of Patent: Nov. 25, 2025

(54) TRANSFER ROBOT, BOX RETRIEVAL METHOD, CARGO BOX LOADING METHOD AND WAREHOUSE LOGISTICS SYSTEM

(71) Applicant: BEIJING GEEKPLUS TECHNOLOGY CO., LTD., Beijing (CN)

(72) Inventor: Yuhui Xiao, Beijing (CN)

(73) Assignee: BEIJING GEEKPLUS TECHNOLOGY CO., LTD., Beijing (CN)

( * ) Notice: Subject to any disclaimer, the term of this patent is extended or adjusted under 35 U.S.C. 154(b) by 399 days.

(21) Appl. No.: 18/000,542

(22) PCT Filed: May 21, 2021

(86) PCT No.: PCT/CN2021/095276
§ 371 (c)(1),
(2) Date: Dec. 2, 2022

(87) PCT Pub. No.: WO2021/249163
PCT Pub. Date: Dec. 16, 2021

(65) Prior Publication Data
US 2023/0211949 A1      Jul. 6, 2023

(30) Foreign Application Priority Data
Jun. 10, 2020   (CN) .......................... 202010524246.4

(51) Int. Cl.
*B65G 1/06*       (2006.01)
*B65G 1/137*      (2006.01)
*B25J 9/00*       (2006.01)

(52) U.S. Cl.
CPC ............. *B65G 1/06* (2013.01); *B65G 1/1375* (2013.01); *B25J 9/0009* (2013.01); *B65G 2201/025* (2013.01)

(58) Field of Classification Search
CPC .................................................... B65G 1/0492
See application file for complete search history.

(56) References Cited

U.S. PATENT DOCUMENTS 4,492,504 A * 1/1985 Hainsworth .............. B66F 9/07
                                              414/280
6,805,526 B2 * 10/2004 Stefani ..................... B65G 1/04
                                              414/280
(Continued)

FOREIGN PATENT DOCUMENTS

CN   107840059        3/2018
CN   108006162 A      5/2018
(Continued)

OTHER PUBLICATIONS

CNIPA, Office Action issued for CN Application No. 202010524246.4, Jul. 5, 2024.
(Continued)

*Primary Examiner* — Mark C Hageman
(74) *Attorney, Agent, or Firm* — Hodgson Russ LLP

(57) ABSTRACT

A transfer robot comprises a movable chassis, a door frame vertically arranged on the movable chassis, and a temporary storage mechanism and a cargo box conveying mechanism which are arranged on the door frame, wherein the temporary storage mechanism is provided with a plurality of temporary storage spaces used for temporarily storing cargo boxes, and the cargo box conveying mechanism can stretch horizontally and lift vertically relative to the door frame so as to convey the cargo boxes between the temporary storage space and a temporary inventory container.

20 Claims, 8 Drawing Sheets

(56) References Cited

U.S. PATENT DOCUMENTS

| | | | |
|---|---|---|---|
| 11,396,424 B2* | 7/2022 | Cheng | B25J 13/08 |
| 11,465,840 B2* | 10/2022 | Cheng | B25J 9/1638 |
| 11,542,135 B2* | 1/2023 | Kong | B66F 9/12 |
| 11,820,004 B2* | 11/2023 | Kong | B66F 9/07 |
| 12,017,854 B2* | 6/2024 | Chen | B65G 1/0435 |
| 12,103,770 B2* | 10/2024 | Kong | B07C 3/08 |
| 2015/0125249 A1 | 5/2015 | Joice et al. | |
| 2017/0267452 A1* | 9/2017 | Goren | B65G 1/0492 |
| 2018/0127212 A1 | 5/2018 | Jarvis et al. | |
| 2018/0305122 A1* | 10/2018 | Moulin | B65G 1/0492 |
| 2020/0078936 A1 | 3/2020 | Wu et al. | |

FOREIGN PATENT DOCUMENTS

| | | |
|---|---|---|
| CN | 207903268 | 9/2018 |
| CN | 208008400 | 10/2018 |
| CN | 109573449 | 4/2019 |
| CN | 110194341 | 9/2019 |
| CN | 209480472 | 10/2019 |
| CN | 110422540 | 11/2019 |
| CN | 110626991 | 12/2019 |
| CN | 209758195 | 12/2019 |
| CN | 110775501 A | 2/2020 |
| CN | 111605958 | 9/2020 |
| CN | 111703799 | 9/2020 |
| CN | 212923034 | 4/2021 |
| CN | 212952422 | 4/2021 |
| CN | 212952423 | 4/2021 |
| JP | 2020500799 | 1/2020 |

OTHER PUBLICATIONS

EPO, Partial Supplementary European Search Report for EP Application No. 21821379.1, Oct. 27, 2023.
JPO, Office Action for JP Application No. 2022-563087, Aug. 29, 2023.
WIPO, International Search Report and Written Opinion for PCT/CN2021/095276, Aug. 6, 2021.
WIPO, International Search Report for International Application No. PCT/CN2021/095276, Aug. 6, 2021.
KIPO, Office Action for KR Application No. 10-2022-7036375, Jan. 20, 2025.

* cited by examiner

TRANSFER ROBOT, BOX RETRIEVAL METHOD, CARGO BOX LOADING METHOD AND WAREHOUSE LOGISTICS SYSTEM

CROSS-REFERENCE TO RELATED APPLICATIONS

This application is a national phase application of International Application No. PCT/CN2021/095276, filed on May 21, 2021, which claims priority to Chinese Patent Application Serial No. 201010524246.4, filed on Jun. 10, 2020, the entire disclosures of which are incorporated herein by reference.

FIELD

The present disclosure relates to the field of warehousing and logistics, and more particularly, to a transfer robot, a box retrieval method, a cargo box loading method, and a warehouse logistics system.

BACKGROUND

With the rapid development of e-commerce, the warehousing and logistics industry has been encountered with unprecedented opportunities and severe challenges. Problems about how to efficiently, cost-effectively, flexibly and accurately carry out package picking have always been a challenge for the warehousing and logistics industry. With the continuous development of robotics, robots have been used to move target inventory containers, which store goods to be picked and placed, to manual workstations, where products on the inventory containers are taken out and put into order boxes. However, the traditional "inventory container—to—person" sorting method requires robots to move the entire inventory container to a picking area, which increases the load of the robot and causes a huge waste of resources.

SUMMARY

According to the present disclosure, a transfer robot is provided. The transfer robot includes a movable chassis, a door frame vertically arranged on the movable chassis, a temporary storage mechanism, and a cargo box conveying mechanism. The temporary storage mechanism and the cargo box conveying mechanism are arranged on the door frame; the temporary storage mechanism has a plurality of temporary storage spaces for temporary storage of cargo boxes; and the cargo box conveying mechanism can transfer the cargo boxes between the temporary storage spaces and inventory containers. The door frame includes a pair of support columns arranged in parallel and spaced apart from each other; the support columns are arranged vertically; and the temporary storage mechanism and the cargo box conveying mechanism are both connected to the pair of support columns. The cargo box conveying mechanism is connected to the door frame through a lifting mechanism; the lifting mechanism is configured to drive the cargo box conveying mechanism to rise and fall vertically; and the lifting mechanism is a self-driven lifting mechanism.

DETAILED DESCRIPTION

Figure 1:
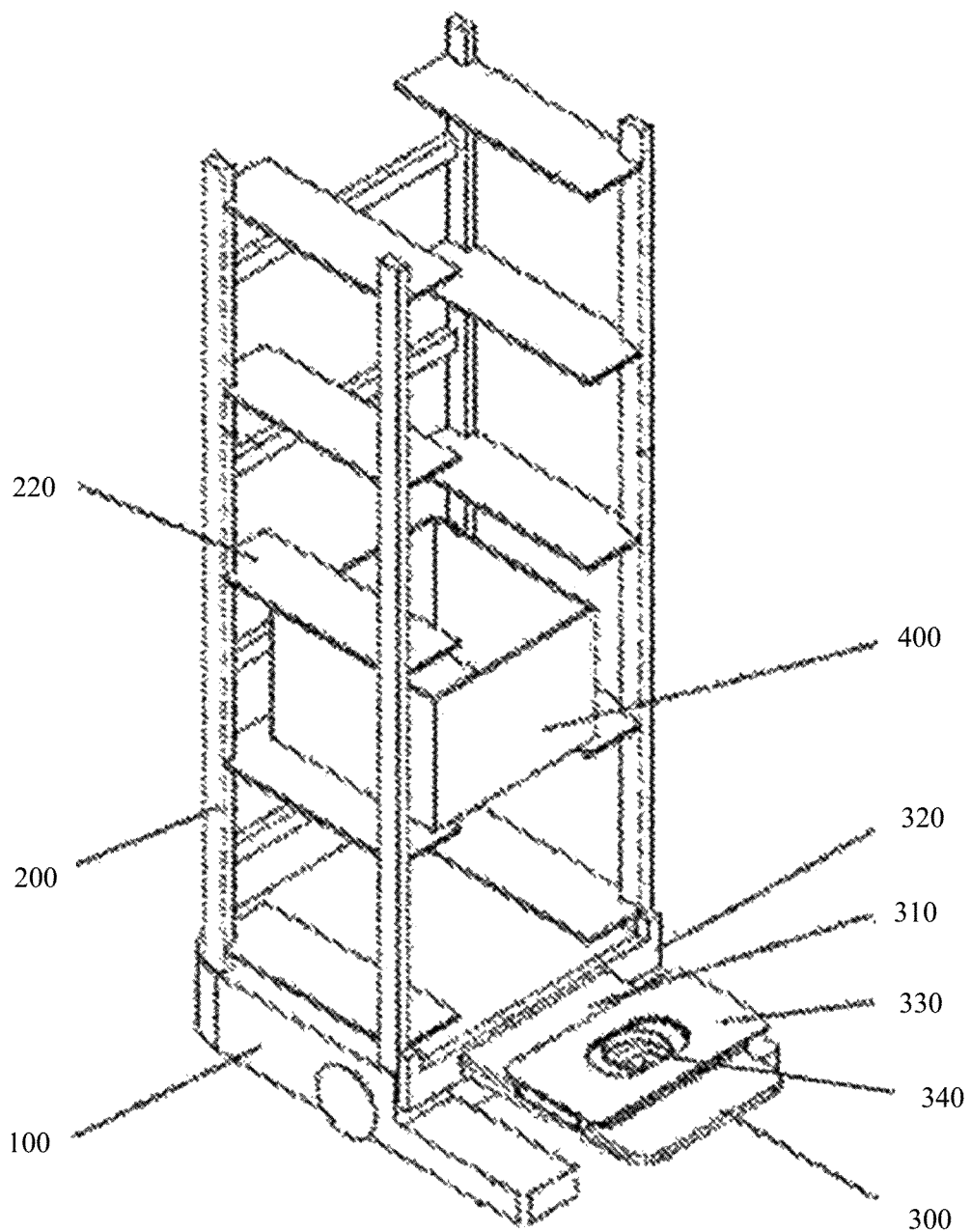
FIG. 1 is a schematic view of a robot for transferring cargo boxes in the related art.

The present disclosure will be described below in detail with reference to the accompanying drawings and embodiments. It can be understood that specific embodiments described herein are intended to explain the present disclosure rather than limit the present disclosure. In addition, it should be noted that, for ease of description, only some structures related to the present disclosure but not all the structures are illustrated in the drawings.

In the description of the present disclosure, unless specified or limited otherwise, terms such as "connected," "coupled" and "fixed" are used broadly, and may be, for example, fixed connections, detachable connections, or integral connections; may also be mechanical connections or electrical connections; may also be direct connections or indirect connections via intervening structures; may also be inner communication or mutual interaction of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

In the description of embodiments, terms such as "upper," "lower" and "right" should be construed to refer to orientations or positions as then described or as shown in the drawings under discussion. These relative terms are for convenience of description and do not indicate or imply that the device or element referred to must have a particular orientation or be constructed or operated in a particular orientation. Thus, these terms shall not be construed as limitations on the present disclosure. In addition, terms such as "first" and "second" are merely used to distinguish in terms of description rather than indicate any special meaning.

FIG. 1 illustrates a robot for transferring cargo boxes in the related art. As shown in FIG. 1, the robot includes a drive unit 100, a cargo box storage unit 200, and a cargo box conveying unit 300. The drive unit 100 carries the cargo box storage unit 200 and enables it to move together with the cargo box conveying unit 300. The cargo box storage unit 200 includes one or more cargo box storage spaces. The cargo box conveying unit 300 is configured to convey cargo boxes 400 between the cargo box storage spaces and the inventory container. The cargo box conveying unit 300 includes a frame 310 for placing cargo boxes, a lifting device 320 for driving the cargo boxes 400 up and down, a telescopic fork 330 for driving the cargo boxes 400 to extend and retract, and a rotation device 340 for driving the cargo boxes 400 to rotate.

In the robot for transferring cargo boxes provided in the related art, since the cargo box conveying unit 300 is arranged on the cargo box storage unit 200, a lifting travel of the cargo box conveying unit 300 is limited by a height of the cargo box storage unit 200. Nevertheless, when the inventory container for storing the cargo boxes 400 is high, the height of the cargo box storage unit 200 is increased, which results in a higher center of gravity for the entire robot and reduced stability of movement. Moreover, the increase in the height of the cargo box storage unit 200 allows more cargo boxes to be transferred by the robot at a single time, increasing the operation load of the robot and reducing the transfer efficiency. Meanwhile, when the cargo box storage unit 200 is high, the cargo boxes in an upper part of the cargo box storage unit 200 are difficult to be picked directly by picking personnel, increasing the difficulty of picking by the personnel.

First Embodiment

Figure 2:
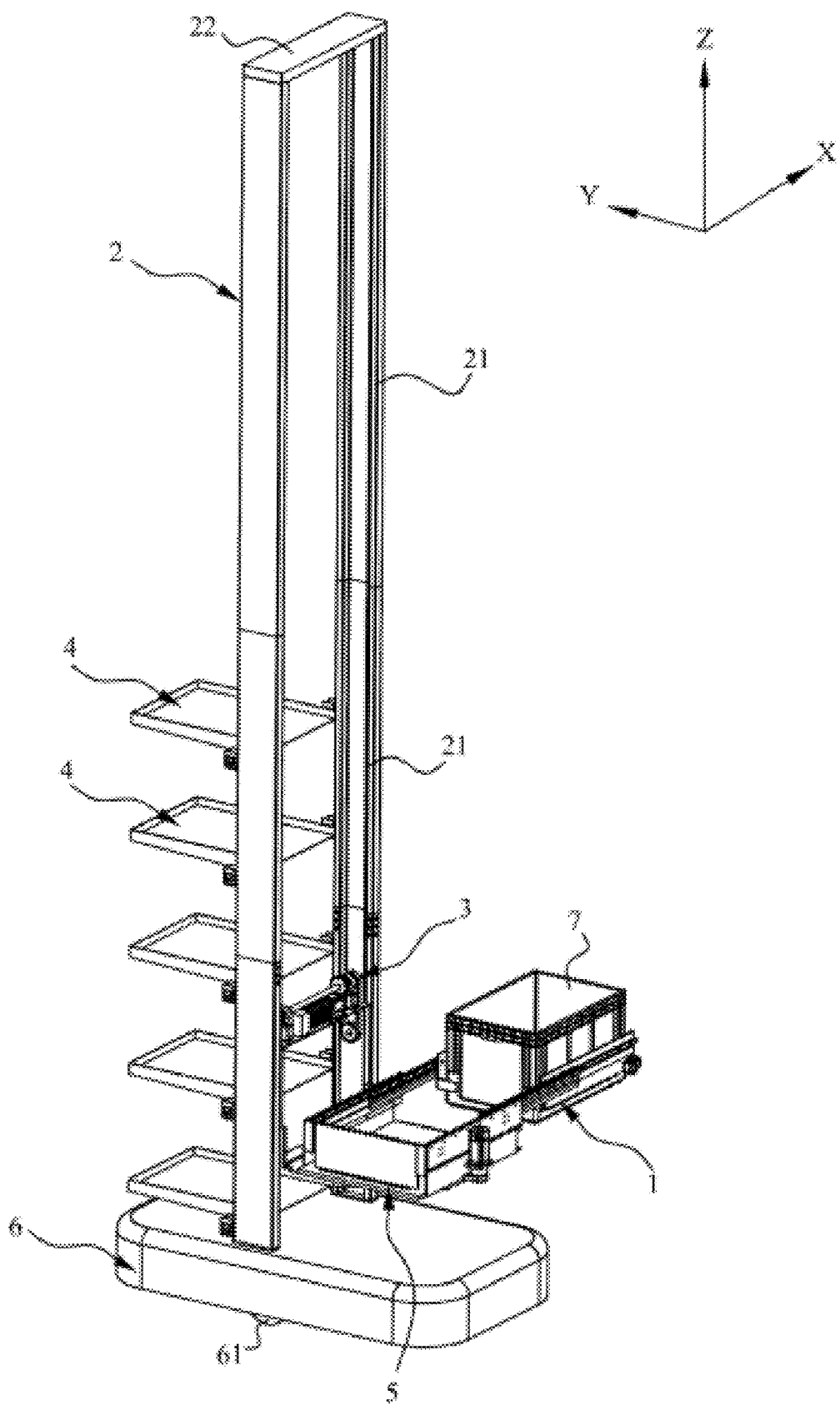
FIG. 2 is a schematic view of a transfer robot according to a first embodiment of the present disclosure.

FIG. 2 is a schematic view of a transfer robot according to a first embodiment of the present disclosure. As shown in FIG. 2, this embodiment provides a transfer robot for carrying, and picking and placing a cargo box 7, which is mainly used in the warehousing and logistics industry. For example, the transfer robot can be used to pick and place and transport the cargo box 7 containing order goods or express deliveries, to implement order-based picking or loading operations. The transfer robot can also be applied to other situations where the cargo box 7 or the goods need to be transferred. The application of the transfer robot in this embodiment is only exemplary, which is not specifically limited herein.

As shown in FIG. 2, the transfer robot according to the first embodiment includes: a movable chassis 6, a door frame 2 vertically arranged on the movable chassis 6, a temporary storage mechanism on the door frame 2, and a cargo box conveying mechanism 1 on the door frame 2. The temporary storage mechanism has a plurality of temporary storage spaces for temporary storage of cargo boxes 7. The cargo box conveying mechanism 1 conveys the cargo boxes 7 between the temporary storage spaces and inventory containers.

In a possible implementation, as shown in FIG. 2, the transfer robot in this embodiment further includes at least one of the following: a rotation mechanism 5, a lifting mechanism 3, a detection assembly, and a control system.

The movable chassis 6 is used to realize movement of the transfer robot on the ground, to realize the transportation of the cargo boxes 7 by the transfer robot. The door frame 2 is vertically arranged on the movable chassis 6. The temporary storage mechanism has several temporary storage spaces for temporary storage of the cargo boxes 7. The rotation mechanism 5 is arranged on the door frame 2, and the cargo box conveying mechanism 1 is connected to the lifting mechanism 3 through the rotation mechanism 5, to allow the cargo box conveying mechanism 1 to rotate on a horizontal plane and rise or fall in a vertical direction. Moreover, the cargo box conveying mechanism 1 is horizontally telescopic to pick up the cargo box 7 in the temporary storage space or in the inventory container. The detection assembly is used to detect a working status of the transfer robot and a state of the external environment. The control system is used to obtain order information of the warehousing logistics, and intelligently regulate operations of the transfer robot based on the order information and detection results of the detection assembly.

For the transfer robot in this embodiment, by arranging the cargo box conveying mechanism 1, the rotation mechanism 5, the lifting mechanism 3, and the temporary storage mechanism on the door frame 2, most of the structures of the transfer robot can be integrated on the door frame 2, facilitating the installation of the rotation mechanism 5, the lifting mechanism 3 and the temporary storage mechanism. Moreover, since the lifting mechanism 3 is separated from the temporary storage mechanism, a lifting height of the lifting mechanism 3 is not affected by a position of the temporary storage mechanism. That is, the lifting mechanism 3 can rise to a higher position to pick and place the cargo box 7, but the temporary storage mechanism can be still arranged at a height suitable for picking personnel. As a result, it is convenient for the picking personnel to pick up, and the transfer robot can pick and place the cargo box 7 in a higher inventory container, enhancing the applicability and versatility of the transfer robot.

Specifically, the movable chassis 6 includes a chassis body and a drive wheel mechanism at a bottom of the chassis body, and the drive wheel mechanism is used to realize movement of the movable chassis 6. The drive wheel mechanism can be in the form of differential drive or other mechanisms that can drive the chassis body to move. This embodiment neither limits the specific form of the drive wheel mechanism, nor limits the specific structure of the movable chassis 6, as long as the structure can drive the door frame 2 to move, such as the existing robot structure.

For the convenience of the following description, in this embodiment, an X-Y-Z coordinate system is constructed, in which X direction is an axis direction of a drive wheel 61 of the movable chassis 6, Z direction is a height direction of the transfer robot, and Y direction is a horizontal direction perpendicular to both X direction and Z direction, and X, Y and Z directions follow the right-hand rule.

Figure 3:
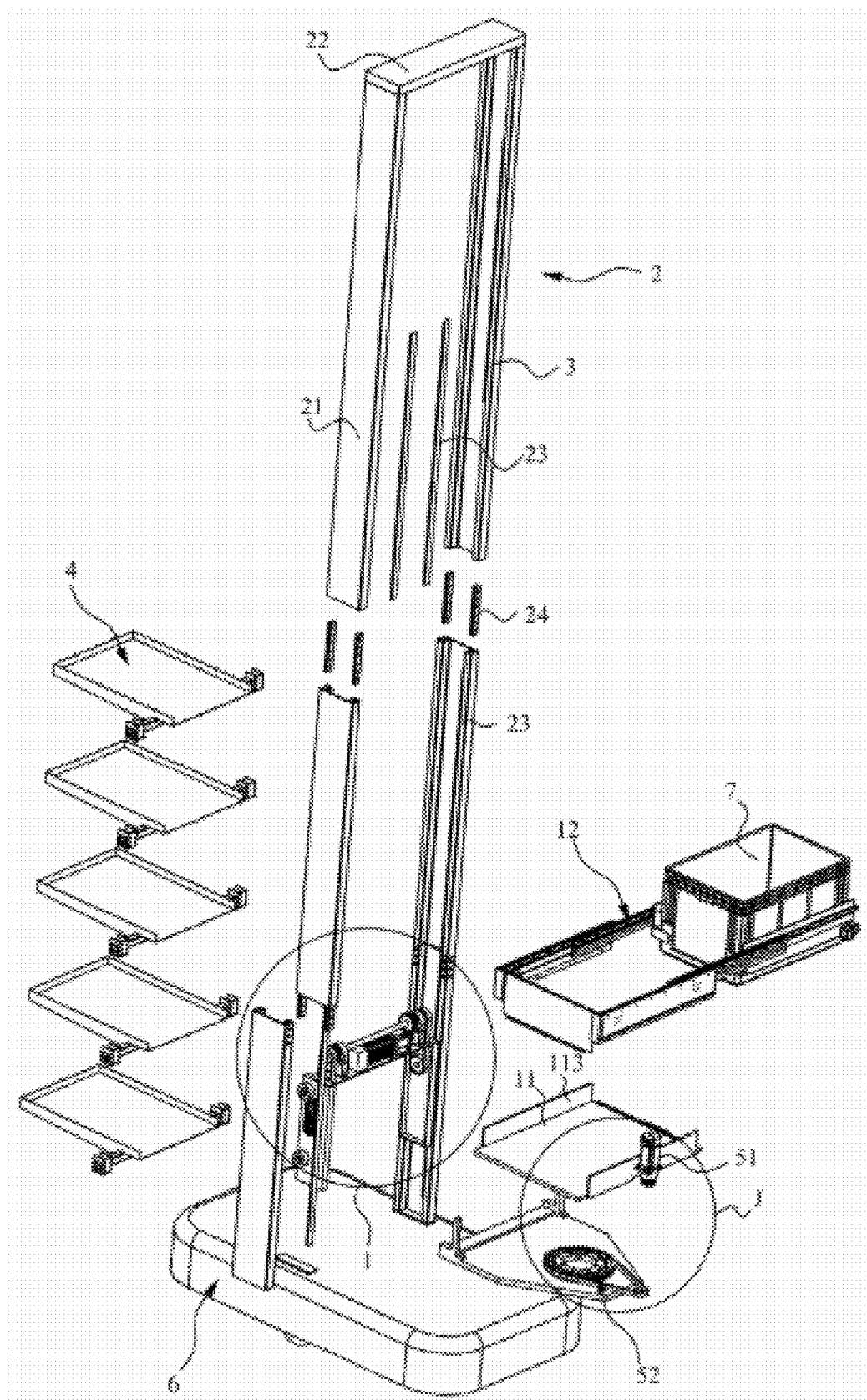
FIG. 3 is an exploded view of the transfer robot according to the first embodiment of the present disclosure.
Figure 4:
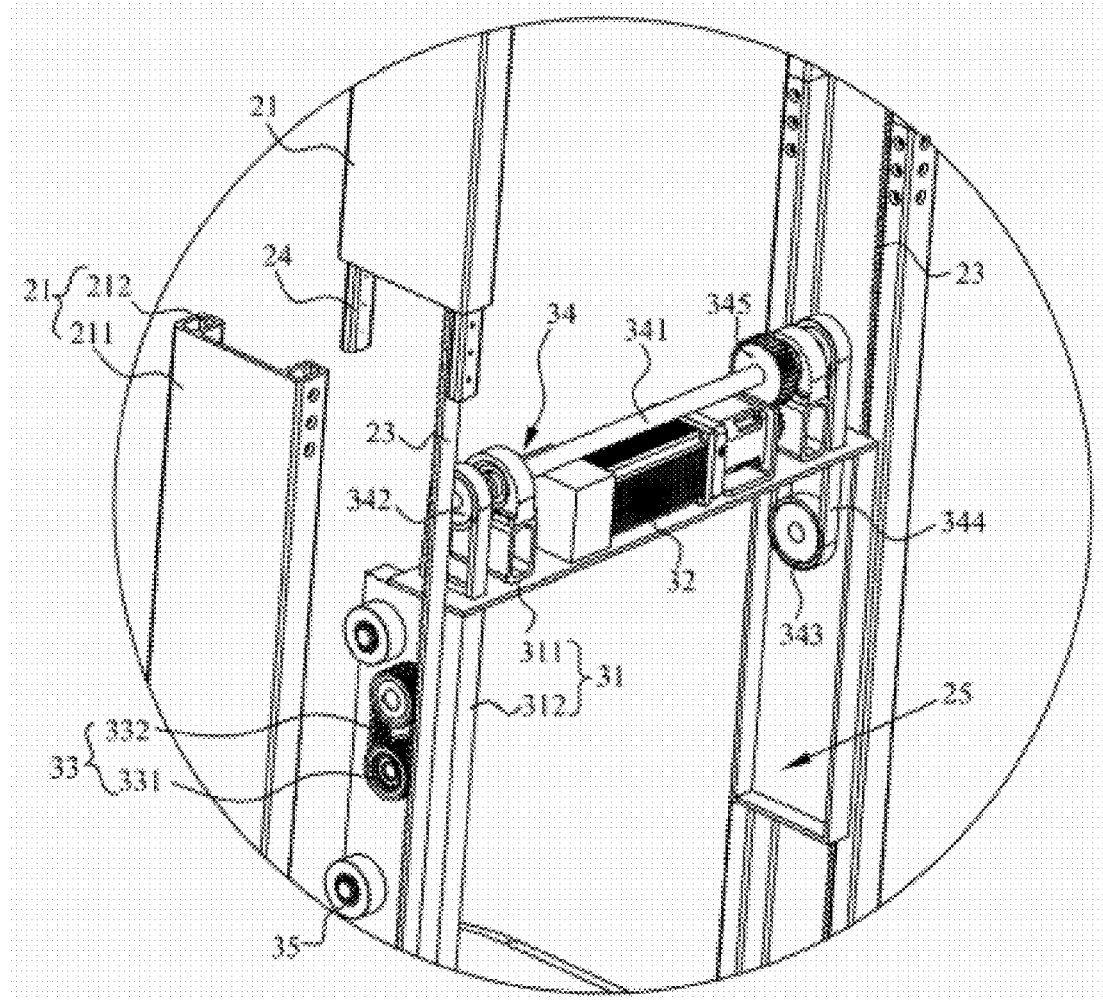
FIG. 4 is a partially enlarged view of part I in FIG. 3.

FIG. 3 is an exploded view of the transfer robot according to an embodiment of the present disclosure, and FIG. 4 is a partially enlarged view of part I in FIG. 3. As shown in FIG. 3 and FIG. 4, the door frame 2 includes a pair of support columns 21 arranged vertically and opposite to each other. The two support columns 21 are arranged on the movable chassis 6 and spaced apart from each other along the X direction. The temporary storage mechanism and the rotation mechanism 5 are on two opposite sides of the door frame 2 along the Y direction. The two support columns 21 define a space for a vertical movement of the lifting mechanism 3 and a telescopic movement of the cargo box conveying mechanism 1 in the Y direction. With such an arrangement, when the transfer robot moves to a passage between two adjacent inventory containers, without turning the transfer robot, the cargo box conveying mechanism 1 on the rotation mechanism 5 can operate, realizing the transfer of the cargo boxes 7 between the temporary storage mechanism and the inventory containers, which improves the efficiency of transferring the cargo boxes 7 by the transfer robot and lowers the requirement about the width of the passage.

Each support column 21 includes: a main body plate 211 arranged vertically and reinforcement rods 212 arranged vertically and located on two opposite sides of the main body plate 211. The main body plate 211 is of a plate-like structure arranged along the Y direction, to enlarge a support range of the support column 21. The reinforcement rods 212 are on the two opposite sides of the main body plate 211 along the Y direction, to enhance the overall structural strength and rigidity of the support column 21, and facilitate the connection of the lifting mechanism 3 and the temporary storage mechanism with the support column 21. Furthermore, the reinforcement rods 212 are located inside the main body plate 211, such that the two reinforcement rods 212 and the main body plate 211 form a U-shaped structure with an opening facing the other support column 21, which can protect a structure in a U-shaped groove of the U-shaped structure.

Further, a cross section of the reinforcement rod 212 is a hollow rectangle, which increases the overall structural strength and rigidity of the support column 21 and reduces the overall weight of the door frame 2. Further, the reinforcement rod 212 and the main body plate 211 are integrally formed, which is convenient for processing and assembly. In other embodiments, the reinforcement rod 212 and the main body plate 211 may also be processed separately and connected by welding. However, it can be understood that the support column 21 in this embodiment is merely an exemplary structure, and in other embodiments, the support column 21 may also have other structural forms, such as a hollow frame structure.

In one embodiment, in order to improve the applicability of the transfer robot to inventory containers of different heights, a plurality of pairs of support columns 21 are arranged along the vertical direction, and two adjacent support columns 21 in the height direction are detachably connected. With such an arrangement, the number of support columns 21 on each side can be selected according to the height of the inventory container on the premise of keeping other settings of the transfer robot unchanged, so that the transfer robot is suitable for the pick-and-place of the cargo boxes 7 in the inventory containers at different heights, which improves the flexibility and versatility of the transfer robot, and reduces the cost of warehousing logistics. Meanwhile, a processing length of a single support column 21 can be decreased, which facilitates the processing and handling of the support column 21, and reduces the processing and transportation costs of the transfer robot.

In this embodiment, two adjacent support columns 21 are detachably connected by a connection strip 24. Specifically, a cross section of the connection strip 24 is consistent with a cross-sectional shape of the hollow cavity of the reinforcement rod 212, and the connection strip 24 includes a plurality of second threaded holes arranged at intervals in a height direction of the connection strip. In two adjacent support columns 21, a side surface of an upper end of a lower reinforcement rod 212 includes a plurality of second through holes; a lower end of the connection strip 24 is inserted into the hollow cavity of the lower reinforcement rod 212 and connected by a threaded connector threaded into the second through hole and the second connecting threaded hole; and an upper end of the connection strip 24 is inserted into the hollow cavity of an upper reinforcement rod 212 and is in interference fit with the hollow cavity. Such an arrangement is convenient and easy to disassemble and connect, and can simplify the processing of the support column 21. By inserting the connection strip 24 into the hollow cavity of the reinforcement rod 212, the overall structure of the door frame 2 becomes beautiful, and the connection strip 24 is prevented from interfering with the lifting mechanism 3 or the temporary storage mechanism.

Further, a lower end of the upper reinforcement rod 212 includes a third hole, and the upper reinforcement rod 212 is connected by a threaded connector threaded into the third through hole and the second connecting threaded hole when the connection strip 24 is inserted into the hollow cavity of the upper reinforcement rod 212. As a result, the strength and reliability of connection between the two adjacent support columns 21 can be enhanced.

In this embodiment, the second hole is arranged on a side of the reinforcement rod 212 away from the other reinforcement rod 212 on the same support column 21 and on a side of the reinforcement rod 212 away from the main body plate 211, to facilitate a screwing operation of the threaded connector. Correspondingly, two adjacent side surfaces of the connection strip 24 are provided with connecting threaded holes, but the present disclosure is not limited thereto. In another embodiment, the connection strip 24 may not be inserted into the hollow cavity of the reinforcement rod 212, and instead may also be connected to an inner or outer side of the reinforcement rod 212. In another embodiment, the two adjacent support columns 21 can also be detachably connected in other ways, which is not specifically limited in the present disclosure. Any way that the upper and lower support columns 21 can be detachably connected falls into the protection scope of the present disclosure.

Optionally, a reinforcement beam 22 is connected to respective top ends of two uppermost support columns 21, and the reinforcement beam 22 is used to enhance the overall structural strength of the door frame 2 and avoid a problem that shaking occurs at a terminal end due to an excessive height of the support columns 21.

The overall structure of the door frame 2 in this embodiment is simple and the processing is convenient. In other embodiments, each side of the cargo box conveying mechanism 1 can be provided with two or more support columns 21 at intervals along the Y direction, as long as the arrangement of the support columns 21 does not affect the working of the rotation mechanism 5, the lifting mechanism 3 and the cargo box conveying mechanism 1.

In this embodiment, the temporary storage mechanism includes a plurality of temporary-storage partition plates 4 spaced apart along the height direction of the door frame 2, each temporary-storage partition plate 4 is perpendicularly connected to the support column 21, and each temporary-storage partition plate 4 can be used to temporarily store one cargo box 7. With this arrangement, the transfer robot can transfer a plurality of cargo boxes 7 at a time, and the efficiency of transferring the cargo boxes 7 can be improved.

Further, each temporary-storage partition plate 4 is detachably connected to the door frame 2, so that a reasonable number of temporary-storage partition plates 4 can be arranged on the door frame 2 according to the height of the inventory container, the height of the door frame 2 and the transfer requirements, improve the flexibility and versatility of the transfer robot. Moreover, the temporary-storage partition plates 4 can be processed and arranged in a modularized manner, which improves the processing and use flexibility of the temporary-storage partition plates 4, and facilitates the processing, assembly and transfer of the temporary-storage partition plates 4.

Figure 6:
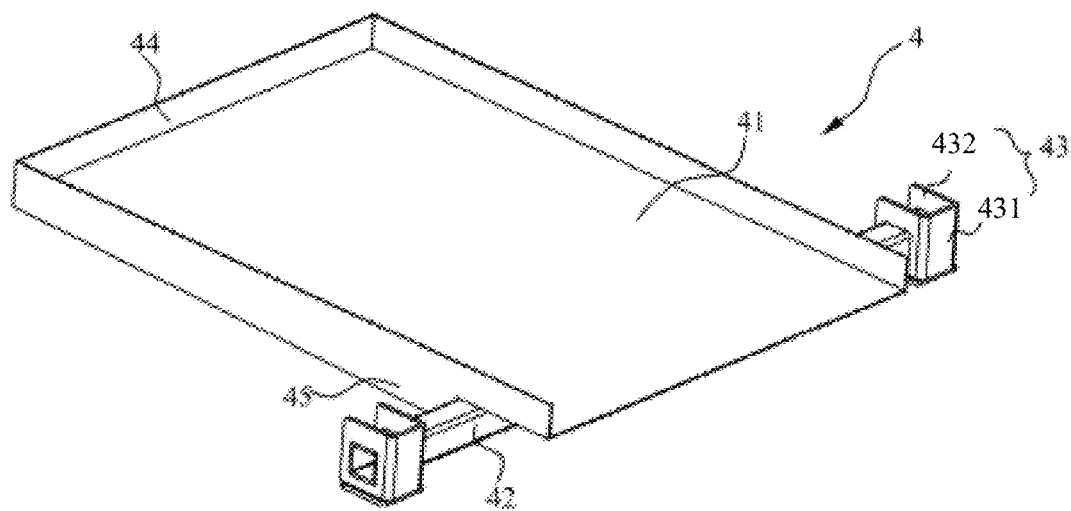
FIG. 6 is a schematic view of a temporary-storage partition plate according to the first embodiment of the present disclosure.

FIG. 6 is a schematic view of the temporary-storage partition plate 4 according to an embodiment of the present disclosure. As shown in FIG. 3 and FIG. 6, the temporary-storage partition plate 4 includes a partition plate body 41 arranged horizontally and a connection rod 42 arranged along the X direction; a lower surface of the partition plate body 41 is connected to the connection rod 42; and two ends of the connection rod 42 are detachably connected to two support columns 21. By providing the partition plate body 41, it is convenient to temporarily store the cargo box 7, and by providing the connection rod 42, the overall structural strength and rigidity of the temporary-storage partition plate 4 can be improved. In addition, in order to improve the strength of connection between the partition plate body 41 and the connection rod 42, the connection rod 42 and the partition plate body 41 are connected by welding.

Further, the partition plate body 41 has a rectangular structure, and three sides of the partition plate body 41 are vertically surrounded by flanges 44. The flanges 44 protrude from an upper surface of the temporary-storage partition plate 4 to prevent the cargo box 7 on the partition plate body 41 from falling off the partition plate body 41. The flanges 44 on the three sides form a U-shaped opening facing a side where the rotation mechanism 5 is located, so as to prevent the flanges 44 from affecting the action of the cargo box conveying mechanism 1.

The connection rod 42 is connected to a side of the partition plate body 41 close to the rotation mechanism 5. In order to further improve the structural strength and rigidity of the temporary-storage partition plate 4, a reinforcing rib plate 45 is connected between a lower surface of the partition plate body 41 and the connection rod 42. In this embodiment, there are three reinforcing rib plates 45; two of the three reinforcing rib plates 45 are on two opposite sides of the partition plate body 41 and are perpendicular to the connection rod 42; and the other reinforcing rib plate 45 is parallel to the connection rod 42 and attached to the connection rod 42. In other embodiments, the position and number of the reinforcing rib plates 45 can also be determined according to actual use requirements and required structural strength and rigidity. Further, the partition plate body 41 is integrally formed with the flanges 44 and the reinforcing rib plates 45, which is convenient to be processed and reduces cost.

In this embodiment, the connection rod 42 is detachably connected to the support column 21 through an adapter 43 provided at an end of the connection rod. The adapter 43 includes one first connection plate 431 and two second connection plates 432 and forms a U-shaped structure; the first connection plate 431 is detachably connected to an outer side surface of one of two reinforcement rods 212, the outer side surface being away from the other reinforcement rod 212; the two second connection plates 432 are parallel and spaced apart from each other; and each of the second connection plates 432 includes a hole for insertion of the connection rod 42, and the connection rod 42 is in interference fit with the hole. As a result, the connection and disassembly between the connection rod 42 and the adapter 43 can be facilitated, thereby facilitating the processing and replacement of the adapter 43. In other embodiments, the connection rod 42 and the adapter 43 can also be welded as one piece.

The first connection plate 431 includes a first through hole, and the reinforcement rod 212 includes a first connecting threaded hole, correspondingly. The adapter 43 is connected by a threaded connector threaded into the first through hole and the first connecting threaded hole. Further, a height position of the temporary-storage partition plate 4 on the support column 21 is adjustable. Specifically, the reinforcement rod 212 includes a plurality of first connecting threaded holes arranged at intervals along a height direction of the reinforcement rod, and the first through hole in the first connection plate 431 is selectively connected to one of the plurality of first connecting threaded holes, thereby adjusting a height position of connection between the first connection plate 431 and the reinforcement rod 212, that is, adjusting the height position of the temporary-storage partition plate 4 on the support column 21.

In an embodiment, the reinforcement rod 212 may be provided with a plurality of first connecting threaded holes evenly spaced over its entire length, so that the positions of the temporary-storage partition plates 4 in the entire height direction of the support column 21 can be adjusted, which widens an adjustment range. In another embodiment, based on a height of a conventional cargo box 7, the number of temporary-storage partition plates 4 on the support column 21 and the height position of each temporary-storage partition plate 4 may be preset, and for each temporary-storage partition plate 4, a plurality of first connecting threaded holes are arranged at intervals along the height direction in a local area where the preset height position is located.

In this embodiment, the position of the temporary-storage partition plate 4 in the height direction is adjusted by arranging the plurality of spaced first connecting threaded holes on the support column 21 along the height direction, which is convenient to adjust and is arranged at intervals. In other embodiments, the height position of the temporary-storage partition plate 4 on the support column 21 may be adjusted in other ways. For example, the first connection plate 431 includes an elongated hole, and the elongated hole has a length direction consistent with the vertical direction and a width adapted to the first connecting threaded hole. Alternatively, other connection methods in the related art can be adopted to realize the height adjustment, which will not be elaborated herein.

It can be understood that the structure of the temporary-storage partition plate 4 in this embodiment is merely exemplary, and this embodiment does not limit the specific structure of the temporary-storage partition plate 4, as long as it can support the cargo box 7 and realize the detachable connection with the door frame 2.

As shown in FIG. 4, the lifting mechanism 3 is used to drive the rotation mechanism 5 and the cargo box conveying mechanism 1 to rise and fall vertically, so as to transfer the cargo boxes 7 at different layers of the inventory container and/or the cargo boxes 7 on the temporary-storage partition plates 4 at different heights. In this embodiment, the lifting mechanism 3 as a self-driven lifting mechanism includes a mounting seat 31, a lifting drive unit 32, and a lifting transmission assembly 33, the lifting drive unit 32 and the lifting transmission assembly 33 being on the mounting seat 31. The support column 21 includes an auxiliary transmission member 23. The lifting drive unit 32 drives the lifting transmission assembly 33 to transmissively cooperate with the auxiliary transmission member 23, to allow the mounting seat 31 to be vertically raised and lowered along the support column 21.

In this embodiment, the lifting drive unit 32 includes a lifting drive motor. The lifting transmission assembly 33 includes two first lifting synchronization wheels 331 spaced apart along the vertical direction, and a first lifting synchronous belt 332 wound around the two first lifting synchronization wheels 331, the first lifting synchronous belt 332 being a double-sided toothed synchronous belt. The lifting drive motor is connected to one of the two first lifting synchronization wheels 331. The auxiliary transmission member 23 is a synchronous belt rack meshing with the first lifting synchronous belt 332. As a result, the lifting drive motor drives one of the two first lifting synchronization wheels 331 to rotate and in turn brings the first lifting synchronous belt 332 into rotation. Since the first lifting synchronous belt 332 meshes with the synchronous belt rack, the synchronous belt rack is fixed. The first lifting synchronous belt 332 rises or falls vertically along the synchronous belt rack when rotating, such that the entire lifting mechanism 3 rises or falls vertically along the height direction of the support column 21.

In this embodiment, there are two groups of lifting transmission assemblies 33, and each support column 21 is correspondingly provided with a synchronous belt rack to ensure the lifting stability of the lifting mechanism 3. Furthermore, the two groups of lifting transmission assemblies 33 are driven by one lifting drive motor to ensure the synchronization of the two groups of lifting transmission assemblies 33 and reduce the operating cost of the lifting mechanism 3.

In order to facilitate the installation of the lifting drive motor and the lifting transmission assemblies 33, the mounting seat 31 includes a first mounting plate 311 arranged horizontally and two second mounting plates 312 vertically arranged at both ends of the first mounting plate 311. The lifting drive motor is arranged on the first mounting plate 311, the lifting transmission assemblies 33 are arranged on the second mounting plates 312. Such an arrangement has a simple structure and can reduce the overall weight of the lifting mechanism 3. Furthermore, the first mounting plate 311 is connected to respective upper ends of the second mounting plates 312. Consequently, a sufficient installation space for the lifting drive motor can be guaranteed, and the lifting mechanism 3 will not occupy the bottom space when moving to the bottom of the door frame 2, which can reduce the interference of the lifting mechanism 3 with the cargo box conveying mechanism 1 and the rotation mechanism 5.

The two groups of lifting transmission assemblies 33 adopt the lifting synchronization transmission component 34 to realize synchronous transmission. In this embodiment, the lifting synchronization transmission component 34 includes a lifting synchronization shaft 341 arranged along the X direction. Two ends of the lifting synchronization shaft 341 are rotatably supported on the first mounting plate 311 through a bearing seat and a bearing. A driven gear 345 is fitted over the lifting synchronization shaft 341; a driving gear is fitted over an output shaft of the lifting drive motor; and the driving gear meshes with the driven gear 345. A second lifting synchronization wheel 342 is fitted over each of the two ends of the lifting synchronization shaft 341. A side of the second mounting plate 312 away from the support column 21 is provided with a third lifting synchronization wheel 343 coaxially connected to one of the first lifting synchronization wheels 331. The second lifting synchronization wheels 342 and the third lifting synchronization wheel 343 are spaced apart from each other in the vertical direction, and a second lifting synchronous belt 344 is wound around the second lifting synchronization wheel 342 and the third lifting synchronization wheel 343.

In this embodiment, in the lifting synchronization transmission assembly 34, by providing the driving gear and the driven gear 345, the lifting synchronization shaft 341 can be driven to rotate, and meanwhile, the lifting speed of the lifting mechanism 3 can be controlled by control over a transmission ratio of the driving gear and the driven gear 345, so as to achieves a purpose of slowing down the lifting. However, it can be understood that the lifting synchronization transmission assembly 34 in this embodiment is only an exemplary structure, and any structure of the lifting synchronization transmission assembly 34 that can realize the synchronous movement of the two groups of lifting transmission assemblies 33 in the related art can be employed in the present disclosure.

In this embodiment, the lifting drive motor, the lifting synchronization shaft 341, and the second lifting synchronization wheel 342 are all arranged above the first mounting plate 311, and each of two ends of the first mounting plate 311 is provided with an avoidance hole for the second lifting synchronous belt 344 to pass through. This arrangement improves the installation stability of the lifting mechanism 3 and avoids interference between the lifting mechanism 3 and the cargo box conveying mechanism 1. In other embodiments, the lifting drive motor and the lifting synchronization shaft 341 may also be arranged on a lower surface of the second mounting plate 312.

In this embodiment, the auxiliary transmission member 23 is arranged on a side of one of the reinforcement rods 212 facing the other reinforcement rod 212 to improve the overall aesthetics of the door frame 2. The lifting transmission assembly 33 is arranged on a side of the second mounting plate 312 facing the main body plate 211, so that the lifting transmission assembly 33 is located in the U-shaped groove of the support column 21 and located between the bottom of the U-shaped groove and the second mounting plate 312, which can protect the lifting transmission assembly 33.

In this embodiment, in order to improve the lifting stability of the lifting mechanism 3, the lifting mechanism 3 further includes a lifting guide assembly to guide the lifting. Further, the lifting guide assembly includes a plurality of lifting guide wheels 35 arranged at intervals in the vertical direction. The lifting guide wheels 35 and the lifting transmission assembly 33 are located on the same side of the second mounting plate 312. The lifting guide wheels 35 and the second mounting plate 312 are rotatably connected, and the lifting guide wheels 35 abut against the reinforcement rod 212 on which no auxiliary transmission member 23 is provided. By arranging the lifting guide wheels 35, the lifting guide wheels 35 and the first lifting synchronous belt 332 are confined between the two reinforcement rods 212, which ensures that the first lifting synchronous belt 332 always meshes with the synchronous belt rack and avoids the rotation, falling and loosening of the lifting mechanism 3. Moreover, since the lifting guide wheels 35 are rotatably connected to the second mounting plate 312, resistance against the vertical lifting of the lifting mechanism 3 can be reduced while performing the guiding and limiting. Moreover, since there is no need for any additional structure on the support column 21 to be fitted with the lifting guide wheel 35, the structural complexity of the transfer robot can be simplified and the modular design of the support column 21 can be facilitated. In other embodiments, the lifting guide assembly may also be slidably connected to the reinforcement rod 212 on which no auxiliary transmission member 23 is arranged.

In this embodiment, when at least two support columns 21 are arranged along the height direction, synchronous belt racks on two adjacent support columns 21 are arranged separately and connected by splicing. In such a way, a lifting travel of the lifting mechanism 3 is not limited by the height of a single support column 21, which is beneficial to the modular arrangement of the support column 21.

In this embodiment, since the lifting transmission assembly 33 adopts a form of synchronous belt transmission, and the auxiliary transmission member 23 is in the form of the synchronous belt rack, it is convenient to connect the synchronous belt rack with the support column 21, and it is convenient to splice the synchronous belt racks on the two adjacent support columns 21, so that the lift mechanism 3 can cross a connection position of the two adjacent support columns 21 and continue the lifting movement. Meanwhile, since more teeth are meshing simultaneously when the first lifting synchronous belt 332 is fitted with the synchronous belt gear, the stability of connection between the lifting mechanism 3 and the support column 21 can be enhanced, and the lift mechanism 3 is prevented from falling off.

However, it can be understood that, in another embodiment, other transmission forms of the lifting mechanism 3 may also be adopted. For example, the lifting transmission assembly 33 is configured as a gear transmission form, and the auxiliary transmission member 23 is configured as a rack fitted with the gear. In another embodiment, the lifting mechanism 3 may also be a non-climbing lifting mechanism 3, such as a sprocket-chain transmission mechanism, a screw-nut transmission mechanism, and a linkage transmission mechanism.

In another embodiment, the support column 21 has a receiving groove 25 with an opening facing the other support column 21; the auxiliary transmission member 23 is arranged on a side groove wall of the receiving groove 25; and the lifting guide assembly is slidably or rollingly connected to the other opposite groove wall.

Figure 7:
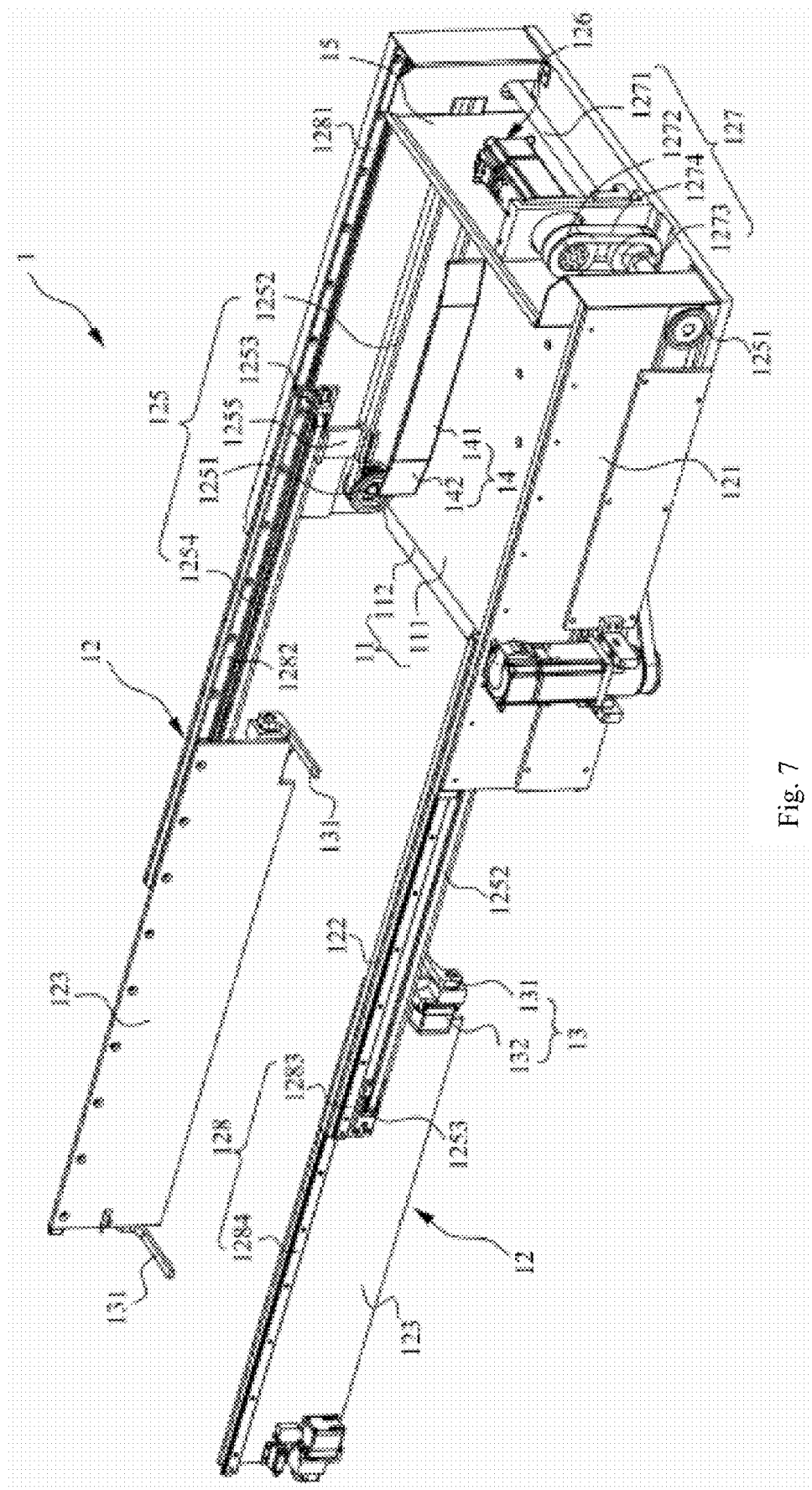
FIG. 7 is a schematic view of a cargo box conveying mechanism according to the first embodiment of the present disclosure.

FIG. 7 is a schematic view of the cargo box conveying mechanism according to an embodiment of the present disclosure. As shown in FIG. 3 and FIG. 7, the cargo box conveying mechanism 1 includes: a transit plate 11, a telescopic assembly 12 and a box retrieval assembly 13. The transit plate 11 is used for temporary storage and transit of the cargo box 7 picked up by the cargo box conveying mechanism 1. The box retrieval assembly 13 is used to pick up the cargo box 7 on the temporary-storage partition plate 4 or the inventory container, so that the cargo box 7 is shifted between the transit plate 11 and the inventory container or between the temporary-storage partition plate 4 and the transit plate 11. The telescopic assembly 12 is connected to the transit plate 11 and the box retrieval assembly 13 and is used to drive the box retrieval assembly 13 to extend and retract horizontally relative to the transit plate 11.

A group of telescopic assemblies 12 is arranged on each of two opposite sides of the transit plate 11. In this embodiment, the telescopic assembly 12 is a two-stage synchronous telescopic structure, which helps to increase a maximum length of the telescopic assembly 12 during extension and reduce a size of the telescopic assembly 12 during retraction, such that the overall size of the transfer robot is reduced, and the extension or retraction efficiency of the box retrieval assembly 13 is improved. Specifically, the telescopic assembly 12 includes a fixed plate 121, a connection plate 122, a telescopic plate 123, a telescopic transmission assembly 125, and a telescopic drive assembly 126. The fixed plate 121, the connection plate 122, and the telescopic plate 123 are arranged in parallel. The telescopic transmission assembly 125 and the telescopic drive assembly 126 drive the connection plate 122 and the telescopic plate 123 to extend or retract synchronously. The fixed plate 121 is perpendicularly connected to the transit plate 11.

In addition, the telescopic assembly 12 may also be a three-stage synchronous telescopic structure.

The telescopic transmission assembly 125 includes: a first telescopic transmission assembly configured to realize horizontal extension and retraction of the connection plate 122 relative to the fixed plate 121; and a second telescopic transmission assembly configured to realize horizontal extension and retraction of the telescopic plate 123 relative to the connection plate 122.

The first telescopic transmission assembly includes: two first pulleys 1251 spaced apart from each other and arranged at both ends of the fixed plate 121; and a first synchronous belt 1252 wound around the two first pulleys 1251, centers of the two first pulleys 1251 being at a same height. The telescopic drive assembly 126 includes a telescopic drive motor having a horizontally arranged output shaft, and the output shaft of the telescopic drive assembly 126 is connected to one of the two first pulleys 1251.

The second telescopic transmission assembly includes: two second pulleys 1253 arranged at both ends of the connection plate 122; and a second synchronous belt 1254 wound around the two second pulleys 1253, centers of the two second pulleys 1253 being at a same height.

A first end of the connection plate 122 is connected to the first synchronous belt 1252 through a first connector 1255; a second end of the fixed plate 121 is connected to the second synchronous belt 1254 through a second connector 1258; and a first end of the telescopic plate 123 is connected to the second synchronous belt 1254 through a third connector.

Taking a direction shown in FIG. 7 as an example, when the telescopic assembly 12 is in an initial retraction state, a first end of the fixed plate 121, the first end of the connection plate 122 and the first end of the telescopic plate 123 are arranged correspondingly, and the first connector 1255 and the third connector are both located at the first end of the fixed plate 121; when the telescopic assembly 12 is in a maximum extension state, the first connector 1255 and the second connector 1258 are both located at the second end of the fixed plate 121, and the third connector is located at a second end of the connection plate 122.

In this embodiment, a group of telescopic assemblies 12 is arranged at each of the two opposite sides of the transit plate 11. In order to realize synchronous rotation of the two telescopic assemblies 12, the telescopic assembly 12 also includes a telescopic synchronization transmission assembly 127. The telescopic synchronization transmission assembly 127 includes a third pulley 1272 fitted over the output shaft of the telescopic drive motor, a telescopic synchronization shaft 1271, a fourth pulley 1273 fitted over the telescopic synchronization shaft 1271, and a third synchronous belt 1274 wound around the fourth pulley 1273 and the third pulley 1272, in which each of both ends of the telescopic synchronization shaft 1271 passes through one first pulley 1251 of each of two telescopic assemblies 12; and the fourth pulley 1273 and the third pulley 1272 are spaced apart in the vertical direction.

In order to horizontally guide the extension and retraction of the telescopic assembly 12, the telescopic assembly 12 further includes a telescopic guide assembly 128. The telescopic guide assembly 128 includes a first guide groove 1281 on an inner side of the fixed plate 121; a second guide groove 1282 on an inner side of the connection plate 122; a first guide rail 1283 on an outer side of the connection plate 122 and slidably fitted with the first guide groove 1281; and a second guide rail 1284 on an outer side of the telescopic plate 123 and slidably fitted with the second guide groove 1282. However, the present disclosure is not limited to the above-mentioned structure of the telescopic guide assembly 128, and any structure capable of realizing the telescopic guide from the related art can be applied to the present disclosure.

The telescopic assembly 12 in this embodiment is a unidirectional telescopic structure, which can reduce the installation cost of the telescopic assembly 12, and adopts a transmission form of the synchronous belt, which has a simple structure, convenient installation, and low cost. However, it can be understood that the structure of the telescopic assembly 12 in this embodiment is only an exemplary structure, and the telescopic assembly 12 is not limited to the above structure. The telescopic assembly 12 can also adopt an existing structure that can realize two-stage synchronous extension and retraction. For example, the first telescopic transmission assembly may employ rack-pinion transmission, chain-sprocket transmission, and etc. Alternatively, the telescopic assembly 12 may also adopt an existing structure that can realize two-stage extension and retraction, which will not be elaborated herein.

In order to prevent the arrangement of the telescopic assembly 12 from interfering with the rotation mechanism 5 below the cargo box conveying mechanism 1, in an embodiment, the telescopic drive assembly 126 and the telescopic synchronization transmission assembly 127 are both arranged above the transit plate 11. In addition, in order to avoid interference of the telescopic drive assembly 126 and the telescopic synchronization transmission assembly 127 with the cargo box 7 on the transit plate 11, a partition plate 15 is arranged on a side of the transit plate 11 where a cargo box entry-exit port is located; a lower surface of the partition plate 15 is perpendicularly connected to the transit plate 11; two ends of the partition plate 15 are detachably connected to two fixed plates 121 correspondingly; and the telescopic drive assembly 126 and the telescopic synchronization transmission assembly 127 are arranged on a side of the partition plate 15 away from the cargo box entry-exit port.

The transit plate 11, the fixed plates 121 on the two opposite sides of the transit plate 11, and the partition plate 15 form a temporary storage area for accommodating the cargo box 7. In order to prevent the cargo box 7 from interfering with the telescopic assembly 12 when the cargo box 7 enters the temporary storage area, optionally, the transit plate 11 is provided with baffles 14 on the two opposite sides corresponding to the telescopic assemblies 12, and the baffles 14 are located inside the telescopic assembly 12 and extend along a telescopic direction of the telescopic assembly 12. A distance between two baffles 14 is slightly larger than a width of the cargo box 7, so that the cargo box 7 can be accommodated between the two baffles 14, and the baffles 14 can prevent the cargo box 7 from colliding with the telescopic assemblies 12.

Further, the baffle 14 includes a baffle main body 141 and a guide plate 142 at each of both ends of the baffle main body 141. The guide plate 142 has a first end connected to the baffle main body 141, and a second end extending obliquely in a direction away from the baffle main body 141 towards a direction close to the fixed plate 121, so that two baffle main bodies 141 at a same end of the transit plate 11 exhibit an outwardly flared structure, to guide the cargo box 7 into the temporary storage area.

Further, the transit plate 11 includes a guide portion 112 at the cargo box entry-exit port; and the guide portion 112 has a first end connected to a transit plate body 111 and a second end obliquely extending downward in a direction away from the transit plate body 111, to further guide the shift of the cargo box 7 onto the transit plate 11.

In order to facilitate the connection between the transit plate 11 and the telescopic assembly 12, an edge-folding portion 113 is arranged at each of two sides of the transit plate which are provided with the telescopic assemblies 12. The edge-folding portion 113 is perpendicularly connected to the transit plate body 111, and the fixed plate 121 of the telescopic assembly 12 is detachably connected to the edge-folding portion 113.

The box retrieval assembly 13 is arranged at a second end of the telescopic plate 123. In this embodiment, the box retrieval assembly 13 is a toggle lever type box retrieval assembly, which includes a toggle lever 131 and a toggle lever driving member 132. A fixed end of the toggle lever driving member 132 is fixed to the telescopic plate 123, and a driving end of the toggle lever driving member 132 is connected to the toggle lever 131, to drive the toggle lever 131 to switch between a working position where the cargo box 7 can be toggled and an idle position where the cargo box 7 cannot be toggled. Optionally, the toggle lever driving member 132 is a drive motor, an output shaft of the drive motor is consistent with a length direction of the telescopic plate 123, and the output shaft of the drive motor is connected to a first end of the toggle lever 131 to drive the toggle lever 131 to rotate in a vertical plane.

Further, when the toggle lever 131 is in the working position, a second end of the toggle lever 131 extends into between the two telescopic plates 123, and the toggle lever 131 is perpendicular to the telescopic plate 123. When the toggle lever 131 is in the idle position, the toggle lever 131 is vertically arranged to avoid collision with other structures when the toggle lever 131 is not working. However, the present disclosure is not limited thereto, and the working position and the idle position of the toggle lever 131 can be set according to requirements. Moreover, the toggle lever 131 can not only be rotated in the vertical plane, but also can be rotated in a horizontal plane to switch between the working position and the idle position.

In this embodiment, the toggle lever driving member 132 is a steering engine, such that a rotation angle of the toggle lever 131 can be precisely controlled through a feedback mechanism and an angle setting of the steering engine, and the steering engine has a small volume, which is beneficial to the installation and arrangement of the toggle lever driving member 132. In other embodiments, the drive motor may also be a servo motor and other driving forms capable of controlling the rotation angle.

The box retrieval assembly 13 is arranged at each of two ends of the telescopic plate 123 along the length direction of the telescopic plate 123. When the cargo box 7 is located on the transit plate 11, two groups of box retrieval assemblies 13 on the same telescopic plate 123 are located on two opposite sides of the cargo box 7 correspondingly, to better realize the movement of the cargo box 7 between the temporary storage area and the inventory container, and achieve the transportation of the cargo box 7 on the inventory containers on two opposite sides of the transfer robot.

Since the telescopic assembly 12 is the unidirectional telescopic assembly, the action of the box retrieval assembly 13 at the end of the telescopic plate 123 close to the partition plate 15 does not affect the pick-up of the cargo box from the inventory container. Therefore, in other embodiments, the box retrieval assembly 13 close to an end of the partition plate 15 only includes the toggle lever 131, and the toggle lever 131 is always perpendicularly connected to the telescopic plate 123, so that the number of the toggle lever driving members 132 can be reduced, and the overall cost and control complexity of the transfer robot can be reduced.

In this embodiment, one toggle lever 131 is arranged at an end of each telescopic plate 123. In other embodiments, the end of the telescopic plate 123 may also be provided with two or more toggle levers 131 at intervals along the height direction.

In this embodiment, the box retrieval assembly 13 adopting the toggle lever 131 can toggle the cargo box 7 by switching a state of the toggle lever 131, which imposes no additional restriction and requirement on the shape and size of the cargo box 7, and has good versatility. Moreover, since the telescopic plates 123 extend to both sides of the cargo box 7 to toggle the cargo box 7, the cargo box 7 can be picked and placed stably and is easy to operate. In other embodiments, other types of box retrieval assemblies 13 in the related art can also be used to pick and place the cargo box 7, such as a clamp-type telescopic fork, and a lift-type telescopic fork. When the clamp-type telescopic fork or the lift-type telescopic fork is used, the transit plate 11 may not perform a function of transferring the cargo box 7 but only serves as a connection support structure for the telescopic assembly 12.

Figure 5:
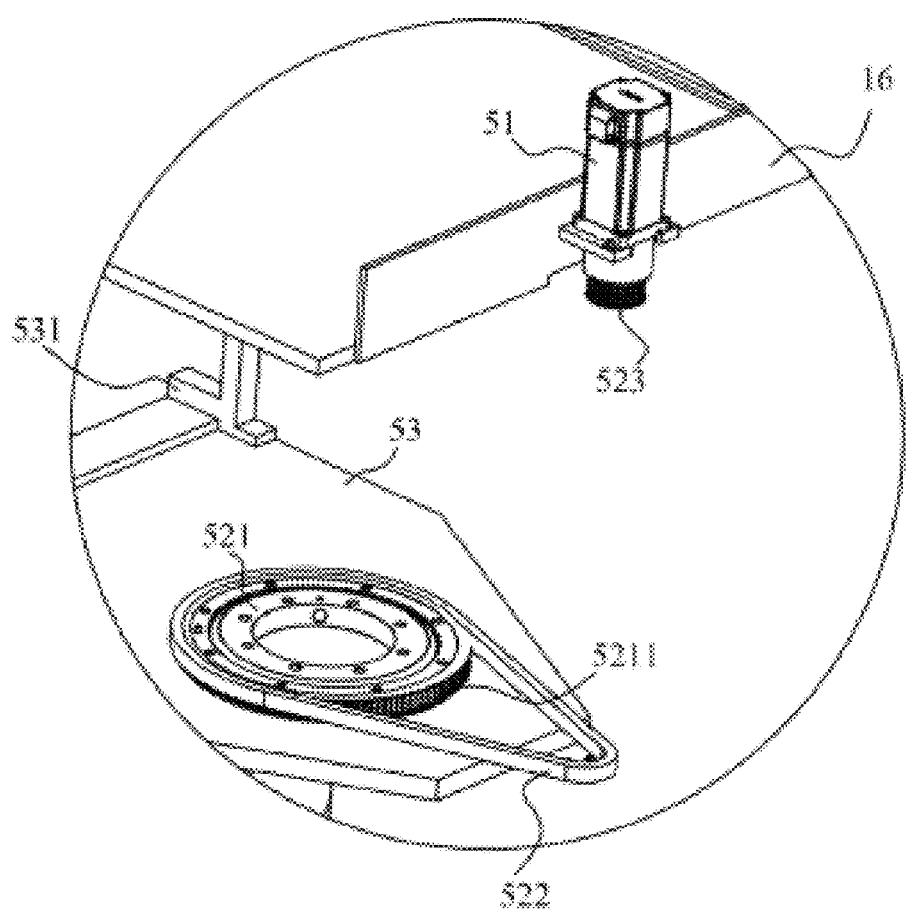
FIG. 5 is a partially enlarged view of part J in FIG. 3.

FIG. 5 is a partially enlarged view of part J in FIG. 3. As shown in FIG. 3 and FIG. 5, the cargo box conveying mechanism 1 is connected to the lifting mechanism 3 through the rotation mechanism 5 to realize rotation of the cargo box conveying mechanism 1 around a vertical axis. The rotation mechanism 5 includes a support plate 53 for connection with the lifting mechanism 3; a rotation transmission assembly 52 arranged between the support plate 53 and a bottom of the cargo box conveying mechanism 1; and a rotation drive unit 51 for driving the rotation transmission assembly 52 to act.

The rotation drive unit 51 includes a rotation drive motor having a vertically arranged drive shaft. In this embodiment, a housing of the rotation drive unit is connected to an outer side surface of the fixed plate 121 through the mounting seat 31, which facilitates the disassembly and assembly of the drive motor. However, this embodiment is not limited thereto, and the rotation drive motor may also be connected to the partition plate 15 or the fixed plate 121. Furthermore, the rotation drive motor is a servo motor, which is beneficial to the precision control over the rotation angle.

The rotation transmission assembly 52 is arranged between a mounting bottom plate of the cargo box conveying mechanism 1 and the support plate 53. The rotation transmission assembly 52 includes a rotation bearing 521, a rotation synchronization wheel 523, and a rotation synchronous belt 522. An inner ring end face of the rotation bearing 521 is connected to the mounting bottom plate, and an outer ring of the rotation bearing 521 is connected to the support plate 53. The rotation synchronous belt 522 is a single-sided toothed synchronous belt having inner transmission teeth. A peripheral surface of the outer ring of the rotation bearing 521 is provided with a ring gear 5211 meshing with the rotation synchronous belt 522. The rotation synchronization wheel 523 is fitted over the drive shaft of the rotation drive motor. The rotation synchronous belt 522 is wound around the ring gear 5211 and the rotation synchronization wheel 523. With this arrangement, when the drive shaft of the rotation drive motor rotates, the rotation synchronous belt 522 is driven to rotate relative to the ring gear 5211. Since the ring gear 5211 is fixed relative to the support plate 53, the rotation synchronous belt 522 rotates horizontally around a center of the ring gear 5211, and hence the rotation drive motor and the cargo box conveying mechanism 1 connected to the rotation drive motor are driven to rotate horizontally.

In this embodiment, in order to ensure the synchronous rotation of the rotation synchronous belt 522 and the rotation drive motor, a bottom surface of the mounting bottom plate is provided with a limiting slot that matches a shape of the rotation synchronous belt 522, and the rotation synchronous belt 522 is snapped in the limiting slot.

In another embodiment, the bottom of the cargo box conveying mechanism 1 is provided with an accommodating groove 25 that matches the shape of the rotation synchronous belt 522, and the rotation synchronous belt 522 is arranged in the accommodating groove 25.

In this embodiment, in order to improve the connection and positioning of the support plate 53 and the lifting mechanism 3, a connection portion 531 is vertically arranged at a position of the support plate 53 corresponding to each of the two second mounting plates 312. The connection portion 531 has an L-shaped structure with a first side connected to the support plate 53 and a second side perpendicular to the support plate 53. Two opposite sides of the second mounting plate 312 abut against two sides of the connection portion 531 correspondingly, and the second mounting plate 312 is threadedly connected to the second side of the connection portion 531 perpendicular to the support plate 53. The structural arrangement of the connection portion 531 can position and limit the connection between the support plate 53 and the second mounting plate 312.

It can be understood that the above structure of the rotation transmission assembly 52 is only an exemplary structure, and the present disclosure does not limit the structure of the rotation transmission assembly 52, as long as the structural form of the rotation transmission assembly 52 can realize the rotation of the cargo box conveying mechanism 1 around the vertical axis relative to the support plate 53, which will fall into the protection scope of the present disclosure.

In this embodiment, the transfer robot further includes a control system for controlling operation of various actions of the transfer robot. The control system includes a controller, an order management module, a navigation module for realizing an autonomous navigation function of the movable chassis 6, an information transmission module, an information processing module, an identification module, a display module, an alarm module, and a power supply module. The drive wheel mechanism, the lifting drive unit 32, the telescopic drive assembly 126, the toggle lever driving member 132, the detection assembly, and various modules in the control system are all connected to the controller. The arrangement of the control system and the operation and control over the transfer robot are conventional in the art, and will not be elaborated in this embodiment.

This embodiment also provides a warehouse logistics system that includes the aforementioned transfer robot.

Second Embodiment

This embodiment provides a transfer robot. Compared with the first embodiment, the transfer robot in this embodiment also includes a movable chassis 6, a door frame 2 arranged on the movable chassis 6, at least two cargo box conveying mechanisms 1 along a height direction of the door frame 2, and a lifting mechanism 3 that drives the box conveying mechanisms 1 to vertically rise or fall relative to the door frame 2. Each cargo box conveying mechanism 1 includes a telescopic assembly 12, a transit plate 11, and a box retrieval assembly 13. The difference between the first and second embodiments lies in that the structure of the telescopic assembly 12 in this embodiment is different from that in the first embodiment. Only the structure of the telescopic assembly 12 is elaborated in this embodiment, and the same structures as the first embodiment will not be repeated.

Figure 8:
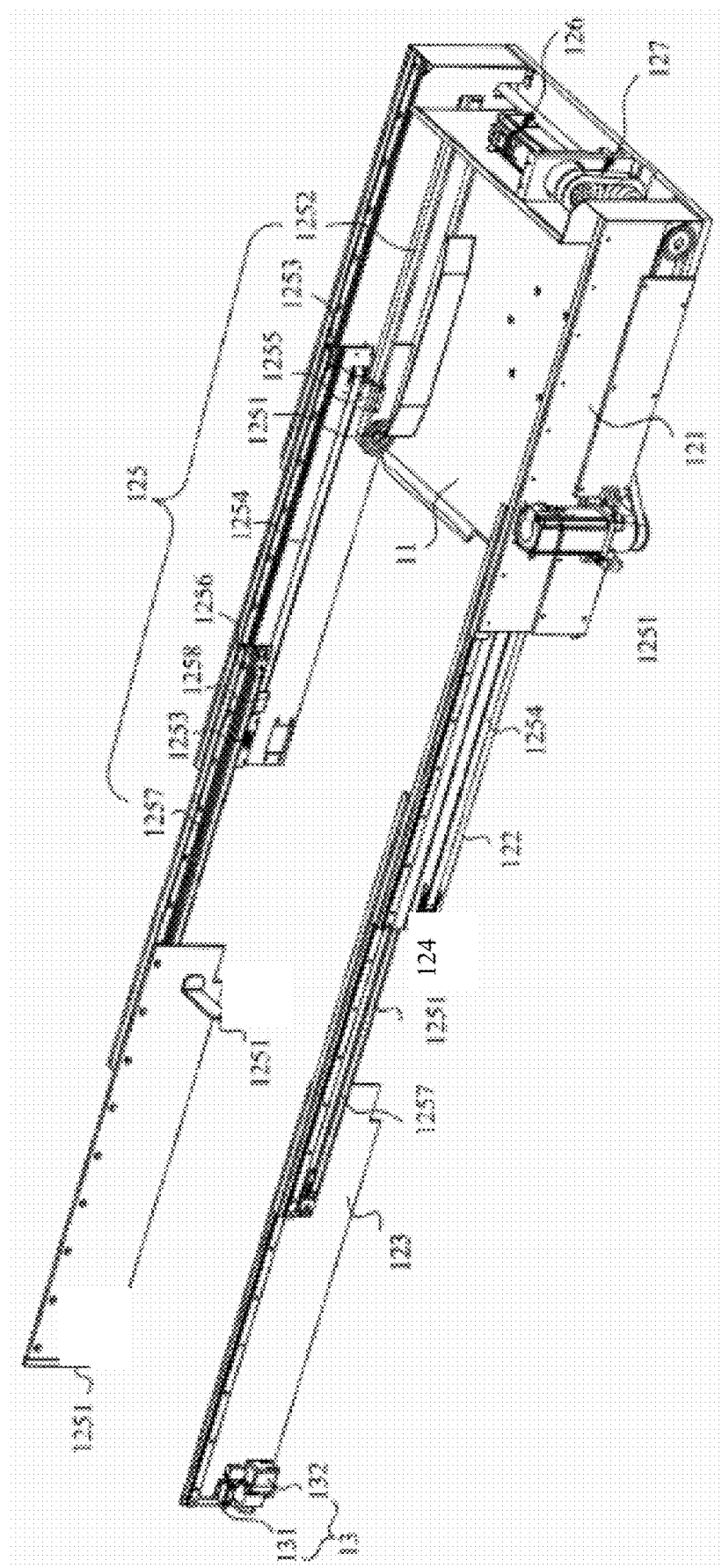
FIG. 8 is a schematic view of a cargo box conveying mechanism according to a second embodiment of the present disclosure.

FIG. 8 is a schematic view of the cargo box conveying mechanism according to the second embodiment of the present disclosure. As shown in FIG. 8, in this embodiment, the telescopic assembly 12 is a three-stage synchronous telescopic structure, which can increase an extension length of the telescopic plate 123, and realize the pick-up of an inner cargo box 7 in a deep double-location inventory container.

In this embodiment, the deep double-location inventory container means that the inventory container includes two storage locations arranged side by side in the telescopic direction of the telescopic assembly 12 along a depth direction. In the warehouse management of the warehouse logistics system, in order to improve the space utilization rate of the warehouse, each inventory container usually has an inventory container immediately adjacent to its first side and another inventory container spaced apart from its second side, and an aisle exists between the two inventory containers spaced apart from each other and allows the transfer robot to pass through.

With such an arrangement, in the deep double-location inventory container, the cargo box 7 in an inside storage location can be toggled by the box retrieval assembly 13 only when an extension plate of the telescopic assembly 12 to pass over an outside storage location. Consequently, a maximum extension length of the telescopic assembly 12 needs to be increased, in order to pick up the cargo box 7 in the inside storage location.

Specifically, the telescopic assembly 12 includes a fixed plate 121, a connection plate 122, an extension plate 124, and a telescopic plate 123 sequentially arranged from the outside to the inside. The telescopic assembly 12 also includes a telescopic transmission assembly 125 and a telescopic drive assembly 126 for realizing synchronous extension and retraction of the connection plate 122, the extension plate 124, and the telescopic plate 123. The telescopic drive assembly 126 includes a drive motor. The telescopic transmission assembly 125 includes a first telescopic transmission assembly configured to realize horizontal extension and retraction of the connection plate 122 relative to the fixed plate 121; a second telescopic transmission assembly configured to realize horizontal extension and retraction of the extension plate 124 relative to the connection plate 122; and a third telescopic transmission assembly configured to realize horizontal extension and retraction of the telescopic plate 123 relative to the extension plate 124.

The first telescopic transmission assembly includes: two first pulleys 1251 arranged at both ends of the fixed plate 121 in a length direction of the fixed plate; and a first synchronous belt 1252 wound around the two first pulleys 1251. Central axes of the two first pulleys 1251 are at a same height. One of the two first pulleys 1251 is connected to an output shaft of the drive motor. A first end of the connection plate 122 is detachably connected to the first synchronous belt 1252 through a first connector 1255.

That is, when the drive motor drives one of the first pulleys 1251 to rotate, the first pulley 1251 drives the first synchronous belt 1252 to rotate. Since a part of the first synchronous belt 1252 located between the two first pulleys 1251 is horizontally arranged and connected to the connection plate 122, the connection plate 122 acts along with the first synchronous belt 1252, realizing the horizontal extension and retraction of the connection plate 122 relative to the fixed plate 121.

The second telescopic transmission assembly includes: two second pulleys 1253 arranged at both ends of the telescopic plate 123; and a second synchronous belt 1254 wound around the two second pulleys 1253. Centers of the two second pulleys 1253 are at a same height. The second synchronous belt 1254 is connected to the extension plate 124 through a second connector 1258 and is connected to a second end of the fixed plate 121 through a third connector.

The third telescopic transmission assembly includes: two fifth pulleys 1256 arranged at both ends of the extension plate 124 in a length direction of the extension plate; and a fourth synchronous belt 1257 wound around the fifth pulleys 1256. Centers of the two fifth pulleys 1256 are at a same height. The telescopic plate 123 is connected to the fourth synchronous belt 1257 through a fourth connector, and a second end of the connection plate 122 is connected to the fourth synchronous belt 1257 through a fifth connector.

Such a transmission structure with three synchronous belts can realize the horizontal extension and retraction of the connection plate 122, the extension plate 124, and the telescopic plate 123. The structure is simple, and the cost is low. When the telescopic assembly 12 is in a retraction state (i.e., an initial state), the first connector 1255, the second connector 1258, and the fourth connector are all located near a first end of the fixed plate 121; the third connector and the fifth connector are located near the second end of the fixed plate 121; and respective first ends of the fixed plate 121, the connection plate 122, the extension plate 124, and the telescopic plate 123 are arranged correspondingly. When the telescopic assembly 12 is in a maximum extension state, the first connector 1255 is located near the second end of the fixed plate 121; the second connector 1258 is located near the second end of the connection plate 122; the third connector is located near the second end of the fixed plate 121; the fourth connector is located near a second end of the extension plate 124; and the fifth connector is located near the second end of the connection plate 122. That is, a telescopic travel of the connection plate 122, the extension plate 124, and the telescopic plate 123 is smaller than a distance between the pulleys at both ends of the connected synchronous belt.

The telescopic assembly 12 according to the present disclosure has a simple structure and is convenient to install, and can realize bidirectional extension and retraction of the telescopic assembly 12, so as to realize synchronous pick-up of the cargo boxes 7 in the inventory containers on two opposite sides of the transfer robot. It can be understood that the present disclosure is not limited to the use of the above-mentioned telescopic assembly 12 to achieve the three-stage extension and retraction. In other embodiments, other three-stage synchronous telescopic structures from the related art can also be used to implement the synchronous extension and retraction of the extension plate 124, the connection plate 122, and the telescopic plate 123. Alternatively, a structure in which the connection plate 122, the extension plate 124 and the telescopic plate 123 extend or retract in a staged manner can be adopted to realize the maximum extension of the telescopic plate 123.

In this embodiment, when the telescopic plate 123 is in the maximum extension state, a total length of the telescopic assembly 12 is greater than a sum of lengths of three cargo boxes 7, so that the telescopic plate 123 can pass over a front storage location to pick up the cargo box 7 in a rear storage location of the deep double-location inventory container.

In this embodiment, the telescopic assembly 12 is arranged at each of two opposite sides of the transit plate 11; the two telescopic assemblies 12 are synchronously driven by the same telescopic drive assembly 126; and the telescopic drive assembly 126 drives the first pulleys 1251 of the two telescopic assemblies 12 through the telescopic synchronization transmission assembly 127.

The structures of the telescopic drive assembly 126 and the telescopic synchronization transmission assembly 127 as well as their arrangement on the transit plate 11 may refer to the first embodiment and will not be elaborated in this embodiment.

However, this embodiment is not limited to the above-mentioned structural form of the synchronization transmission assembly, and other structural forms that can realize the synchronous rotation of the two first pulleys 1251 can also be used, which will not be illustrated in detail.

It can be understood that the transfer robot in this embodiment is not only suitable for picking and placing the cargo boxes 7 in the deep double-location inventory containers, but also suitable for picking and placing deep three-location or deep four-location inventory containers. Moreover, for the deep double-location inventory containers and the deep four-location inventory containers, when placed in a warehouse, every two adjacent inventory containers are spaced apart to form an aisle between the two inventory containers to allow the transfer robot to pass through.

This embodiment also provides a warehouse logistics system that includes the aforementioned transfer robot.

Third Embodiment

Figure 9:
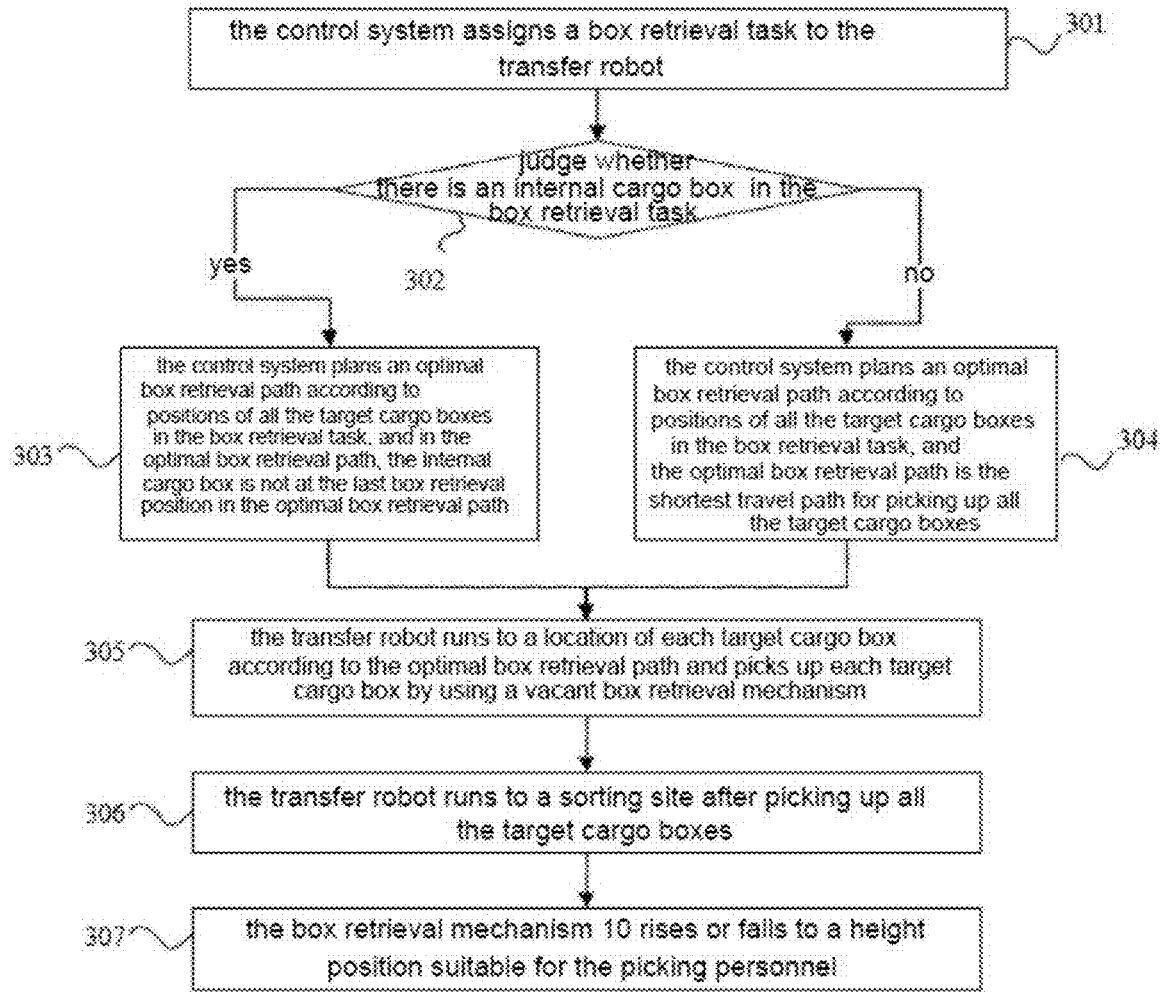
FIG. 9 is a flowchart of a box retrieval method according to a third embodiment of the present disclosure.

FIG. 9 is a flowchart of a box retrieval method according to a third embodiment of the present disclosure. As shown in FIG. 9, the box retrieval method according to this embodiment picks up a target cargo box on an inventory container by using the transfer robot according to the first or second embodiment, so as to realize a sorting task.

The box retrieval method in this embodiment includes:
Step 301: assigning a box retrieval task to the transfer robot by a control system;
Step 302: determining whether there is an internal cargo box 7 during the box retrieval task, when planning the box retrieval path; executing step 303 if yes; and executing step 304 if no;
Step 303: planning an optimal box retrieval path by the control system based on positions of all target cargo boxes during the box retrieval task, wherein the internal cargo box 7 is not at the last box retrieval position in the optimal box retrieval path;
Step 304: planning an optimal box retrieval path by the control system based on positions of all target cargo boxes during the box retrieval task, wherein the optimal box retrieval path is the shortest path for picking up all the target cargo boxes; and
Step 305: operating the transfer robot to run to each target cargo box based on the optimal box retrieval path and pick up each target cargo box by a vacant cargo box conveying mechanism 1.

In step 305, picking up each target cargo box includes:
Step 3051: controlling an action of the rotation mechanism 5 by the control system depending on which side the target cargo box is located relative to the transfer robot, and allowing an extension direction of the cargo box conveying mechanism 1 faces an inventory container where the target cargo box is located;
Step 3052: controlling an action of the lifting mechanism 3 by the control system according to a height of the inventory container where the target cargo box is located, so that a center of the cargo box conveying mechanism 1 is aligned with a center of the target cargo box;
Step 3053: determining whether the target cargo box is the internal cargo box 7; executing step 3054 if not; and executing step 30513 if yes;
Step 3054: controlling an action of the telescopic assembly 12 by the control system, and allowing the telescopic plate 123 to extend until the two telescopic plates 123 are located on two opposite sides of the target cargo box;
Step 3055: controlling an action of a front box retrieval assembly 13 by the control system, to rotate the toggle lever 131 to the working position;
Step 3056: controlling an action of the telescopic assembly 12 by the control system, to retract the telescopic plate 123 to an initial position, and allowing the toggle lever 131 to move the target cargo box onto the transit plate 11;
Step 3057: controlling an action of the front box retrieval assembly 13 by the control system, to rotate a front toggle lever 131 to the idle position;
Step 3058: controlling the rotation mechanism 5 by the control system to rotate by 90°, so that an extension direction of the telescopic assembly 12 faces the temporary-storage partition plate 4;
Step 3059: controlling the action of the lifting mechanism 3 by the control system, so that the transit plate 11 is flush with the temporary-storage partition plate 4;
Step 30510: controlling an action of a rear box retrieval assembly 13 by the control system, to rotate a rear toggle lever 131 to the working position, wherein this step may be omitted when the rear box retrieval assembly 13 is always perpendicular to the fixed plate 121;
Step 30511: controlling an action of the telescopic assembly 12 by the control system, to allow the telescopic plate 123 to extend and enable the rear toggle lever 131 to drive the target cargo box to be pushed from the transit plate 11 into a corresponding temporary-storage partition plate 4;
Step 30512: controlling actions of the telescopic assembly 12 and the rear box retrieval assembly 13 by the control system, so that the telescopic plate 123 is retracted to the initial state, and the toggle lever 131 returns to the idle position, wherein the action of the rear box retrieval assembly 13 can be omitted when the rear box retrieval assembly 13 is always perpendicular to the fixed plate 121;
Step 30513: controlling an action of the cargo box conveying mechanism 1 by the control system, so that an external cargo box 7 with respect to the internal cargo box 7 is conveyed to the temporary-storage partition plate 4, and then the internal cargo box 7 is conveyed to another vacant temporary-storage partition plate 4, wherein the operations of conveying the external cargo box 7 to the temporary-storage partition plate 4 and conveying the internal cargo box 7 to another temporary-storage partition plate 4 by the cargo box conveying mechanism 1 can refer to steps 3054 to 30512; and Step 30514: controlling the action of the cargo box conveying mechanism 1 by the control system after the internal cargo box 7 is conveyed to the temporary-storage partition plate 4, to return the internal cargo box 7 on the temporary-storage partition plate 4 to an external storage location corresponding to the internal cargo box 7, wherein by returning the external cargo box 7 to an internal storage location corresponding to the internal cargo box 7, the target cargo box can be directly returned to the external storage location after the internal cargo box 7 is selected, to avoid an operation of picking up the cargo box 7 at the external storage location caused by the box return to the internal storage location, thereby improving the box return efficiency.

The box retrieval method further includes:

Step 306: operating the transfer robot to run to a sorting site after all the target cargo boxes are picked up; and Step 307: raising or lowering the cargo box conveying mechanism 10 sequentially to a height position suitable for the picking personnel.

The box retrieval method according to this embodiment uses the transfer robot in the first or second embodiment to perform a box retrieval operation on the cargo box 7, so that the height of the cargo box 7 that can be picked up is not limited to the height of the temporary-storage partition plate 4, which improves the applicability and versatility of the box retrieval method. Moreover, the transfer robot can transfer a plurality of cargo boxes 7 simultaneously, which improves the transfer efficiency and hence the efficiency of warehouse logistics.

Fourth Embodiment

Figure 10:
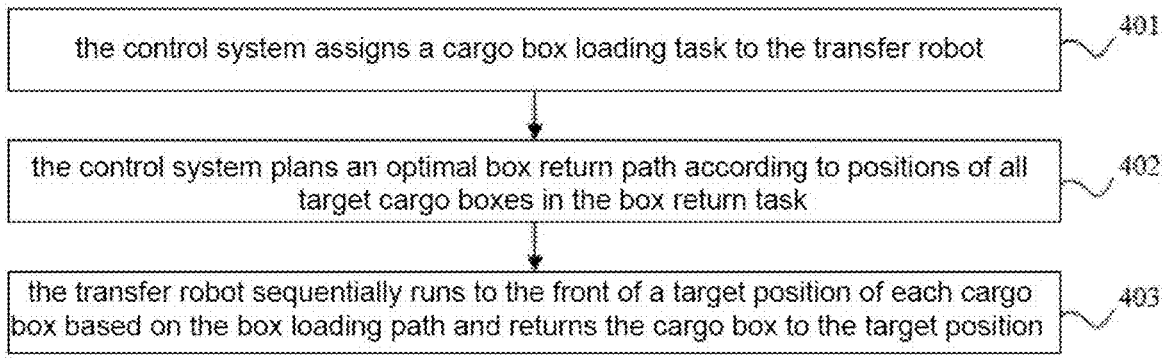
FIG. 10 is a flowchart of a cargo box loading method according to a fourth embodiment of the present disclosure.

FIG. 10 is a flowchart of a cargo box loading method according to a fourth embodiment of the present disclosure. As shown in FIG. 10, this embodiment provides a cargo box loading method based on a transfer robot, to load a cargo box 7 to a target position of an inventory container, which improves the efficiency of loading the cargo box 7 or returning the cargo box after sorting by the transfer robot. The cargo box loading method according to this embodiment is applicable to the transfer robot in the first embodiment or the second embodiment.

It can be understood that the loading of the cargo box 7 may be a return operation of returning the cargo box 7 to the storage location in the inventory container after a sorting operation of picking up the cargo box 7 from the inventory container, or may be a loading operation of replenishing a new cargo box 7 into the inventory container, or may be an operation of placing the cargo box 7 into the inventory container for other reasons, which will not be specifically limited in this embodiment.

Specifically, the cargo box loading method in this embodiment includes:

Step 401: assigning a cargo box loading task to the transfer robot by a control system;

Step 402: planning an optimal cargo box loading path by the control system based on positions of all target cargo boxes during the cargo box loading task; and Step 403: operating the transfer robot to run to the front of a target position of each target cargo box sequentially based on the optimal cargo box loading path and place each target cargo box to the corresponding target position.

The operation of placing the cargo box 7 in the target position by the cargo box conveying mechanism 1 includes:

Step 4031: controlling an action of the lifting mechanism 3 by the control system, so that the cargo box conveying mechanism 1 rises or falls to a height where the cargo box 7 to be loaded can be picked up; controlling the action of the lifting mechanism 3 by the control system, so that the cargo box conveying mechanism 1 rises or falls until the transit plate 11 is flush with a height position of the temporary-storage partition plate 4 where the cargo box 7 to be loaded is located, which the cargo box conveying mechanism 1 rises or falls to be directly opposite to the cargo box 7 to be loaded when there is no transit plate 11;

Step 4032: controlling an action of the rotation mechanism 5 by the control system, so that an extension direction of the cargo box conveying mechanism 1 faces the cargo box 7 to be loaded; and Step 4033: controlling an action of the cargo box conveying mechanism 1 by the control system, to transfer the cargo box 7 from the temporary storage mechanism to the cargo box conveying mechanism 1.

The step 4033 specifically includes:

Step 40331: controlling an action of the telescopic assembly 12 by the control system, so that two telescopic plates 123 extend to be located on both sides of the cargo box 7;

Step 40332: controlling an action of a front cargo box conveying mechanism by the control system, to rotate the toggle lever 131 to the working position;

Step 40333: controlling the action of the telescopic assembly 12 by the control system, so that the telescopic plate 123 is retracted to the initial position, and at the same time, the toggle lever 131 toggles the cargo box 7 from the temporary-storage partition plate 4 to the transit plate 11; and Step 40334: controlling an action of a front box retrieval assembly 13, to rotate the toggle lever 131 to the idle position.

The operation of placing the cargo box 7 in the target position by the cargo box conveying mechanism 1 further includes:

Step 4035: controlling the action of the lifting mechanism 3, so that the cargo box conveying mechanism 1 is raised and lowered to be flush with a center height of the target position; and controlling the action of the lifting mechanism 3, so that the transit plate 11 is flush with the partition plate where the target position is located;

4036: controlling the action of the rotation mechanism 5, so that the extension direction of the cargo box conveying mechanism 1 faces the target position; and Step 4037: controlling the action of the cargo box conveying mechanism 1 by the control system, to load the cargo box 7 on the cargo box conveying mechanism 1 into the target position.

The step 4037 specifically includes:

Step 40371: controlling an action of a rear box retrieval assembly 13 by the control system, to rotate the rear toggle lever 131 to the working position, wherein it can be understood that steps 4036-4039 are in no particular order, and can be performed simultaneously or in any order, and may be omitted when the rear box retrieval assembly 13 is always perpendicular to the fixed plate 121;

Step 40372: controlling an action of the telescopic assembly 12 by the control system, so that the telescopic plate 123 extends, and at the same time the rear toggle lever 131 toggles the cargo box 7 from the transit plate 11 to the target position;

Step 40373: controlling an action of the rear box retrieval assembly 13 by the control system, to rotate the rear toggle lever 131 from the working position to the idle position, in which this step may be omitted when the rear box retrieval assembly 13 is always perpendicular to the fixed plate 121; and Step 40374: controlling an action of the telescopic assembly by the control system, to retract the telescopic assembly 12 to the initial state, wherein it can be understood that steps 40373 and step 40374 can be performed simultaneously or in any other sequence.

The cargo box loading method in this embodiment uses the transfer robot in the first or second embodiment to carry out an loading operation of the cargo box 7, so that the height of the cargo box 7 is not limited to the height of the temporary-storage partition plate 4, which improves the applicability and versatility of the cargo box loading method. Moreover, the transfer robot can transfer a plurality of cargo boxes 7 simultaneously, which improves the transfer efficiency and hence the efficiency of warehouse logistics.

The present disclosure has the following beneficial effects.

For the transfer robot according to the present disclosure, most structures of the transfer robot are integrated on the door frame by arranging the cargo box conveying mechanism and the temporary storage mechanism on the door frame, which is beneficial to the installation of the cargo box conveying mechanism and the temporary storage mechanism. Meanwhile, since the door frame and the temporary storage mechanism are arranged separately, the lifting height of the cargo box conveying mechanism is not affected by the position of the temporary storage mechanism. That is, the cargo box conveying mechanism may rise to a higher position to pick up or place the cargo box, while the temporary storage mechanism may be arranged at a height suitable for the picking personnel. As a result, the picking personnel can perform sorting conveniently, and the transfer robot can pick up or place cargo boxes of higher inventory containers, which improves the applicability and versatility of the transfer robot.

The box retrieval method according to the present disclosure uses the above-mentioned transfer robot to carry out a cargo box retrieval operation, so that the height of the cargo box to be picked up is not limited to the height of the temporary-storage partition plate, improving the applicability and versatility of the box retrieval method. Moreover, the transfer robot can transfer a plurality of cargo boxes at the same time, which improves the transfer efficiency and hence the efficiency of warehouse logistics.

The cargo box loading method according to the present disclosure uses the above-mentioned transfer robot to carry out a cargo box loading operation, so that the height of the cargo box to be loaded is not limited to the height of the temporary-storage partition plate, improving the applicability and versatility of the cargo box loading method. Moreover, the transfer robot can transfer a plurality of cargo boxes at the same time, which improves the transfer efficiency and hence the efficiency of warehouse logistics.

The warehouse logistics system according to the present disclosure uses the above-mentioned transfer robot to transfer cargo boxes, thereby improving the versatility and applicability of the transfer robot, and improving the efficiency of warehouse logistics.

It should be noted that some embodiments and technical principles of the present disclosure are described above. Those skilled in the art should understand that the present disclosure is not limited to the specific embodiments described herein, and various obvious changes, modifications, and substitutions can be made without departing from the protection scope of the present disclosure. Therefore, although the present disclosure has been described in detail through the above embodiments, the present disclosure is not limited to the above embodiments, and can also include more other equivalent embodiments without departing from the scope of the present disclosure. The scope of the present disclosure is determined by the appended claims.

What is claimed is:

1. A transfer robot, comprising a movable chassis, a door frame vertically arranged on the movable chassis, a temporary storage mechanism, and a cargo box conveying mechanism,
wherein the temporary storage mechanism and the cargo box conveying mechanism are arranged on the door frame; the temporary storage mechanism has a plurality of temporary storage spaces for temporary storage of cargo boxes; and the cargo box conveying mechanism transfers the cargo boxes between the temporary storage spaces and inventory containers;
the door frame comprises a pair of support columns arranged in parallel and spaced apart from each other; the support columns are arranged vertically; and the temporary storage mechanism and the cargo box conveying mechanism are both connected to the pair of support columns;
the cargo box conveying mechanism is connected to the door frame through a lifting mechanism; the lifting mechanism is configured to drive the cargo box conveying mechanism to rise and fall vertically; and the lifting mechanism is a self-driven lifting mechanism;
the door frame comprises an auxiliary transmission member;
the lifting mechanism further comprises a lifting guide assembly configured to guide a vertical movement of the lifting mechanism; and
one of the pair of support columns has a receiving groove with an opening facing another support column of the pair of support columns; the auxiliary transmission member is arranged on a side groove wall of the receiving groove; and the lifting guide assembly is slidably or rollingly connected to a groove wall opposite to the side groove wall.

2. The transfer robot according to claim 1, wherein:
the temporary storage mechanism comprises a plurality of temporary-storage partition plates arranged at intervals along a height direction and detachably connected to the door frame; and
each of the plurality of temporary storage spaces is on an upper surface of each of the plurality of temporary-storage partition plates.

3. The transfer robot according to claim 2, wherein:
each of the plurality of temporary-storage partition plates comprises a partition plate body arranged horizontally and a connection rod arranged on a lower surface of the partition plate body;
two ends of the connection rod are detachably connected to the door frame;
a reinforcing rib plate is connected between the lower surface of the partition plate body and the connection rod;

a flange is arranged around a periphery of the partition plate body, and the flange protrudes from the upper surface of the temporary-storage partition plate and encloses the temporary storage space with one open end; and the connection rod is detachably connected to each of the support columns through an adapter at an end of the connection rod.

4. The transfer robot according to claim 3, wherein:

the adapter comprises one first connection plate and two second connection plates and forms a U-shaped structure;

the first connection plate is detachably connected to an outer side surface of one of two reinforcement rods, the outer side surface being away from the other of the two reinforcement rod;

the two second connection plates are parallel and spaced apart from each other; and each of the second connection plates comprises a hole for insertion of the connection rod, and the connection rod is in interference fit with the hole.

5. The transfer robot according to claim 4, wherein:

the first connection plate comprises a first through hole, and the reinforcement rod comprises a first connecting threaded hole, correspondingly;

the adapter is connected by a threaded connector threaded into the first through hole and the first connecting threaded hole; and the reinforcement rod comprises a plurality of first connecting threaded holes arranged at intervals along a height direction of the reinforcement rod, and the first through hole in the first connection plate is selectively connected to one of the plurality of first connecting threaded holes.

6. The transfer robot according to claim 1, wherein:

a plurality of pairs of support columns are arranged along a height direction, and two adjacent support columns in the height direction are detachably connected;

each of the support columns comprises a main body plate arranged vertically and reinforcement rods arranged on two opposite sides of the main body plate, each reinforcement rod having a hollow cavity with two open ends;

a connection strip is arranged between the two adjacent support columns in the height direction, and two ends of the connection strip are inserted into respective hollow cavities of upper and lower reinforcement rods of the two adjacent support columns; and for each pair of support columns, the reinforcement rods are arranged on an inner side of the main body plate of one support column, and the two reinforcement rods together with the main body plate form a U-shaped structure with an opening facing the other support column.

7. The transfer robot according to claim 6, wherein:

a cross section of the connection strip is consistent with a cross-sectional shape of the hollow cavity of the reinforcement rod, and the connection strip comprises a plurality of second threaded holes arranged at intervals in a height direction of the connection strip; and in the two adjacent support columns, a side surface of an upper end of the lower reinforcement rod comprises a plurality of second through holes; a lower end of the connection strip is inserted into the hollow cavity of the lower reinforcement rod and connected by a threaded connector threaded into the second through hole and the second connecting threaded hole; and an upper end of the connection strip is inserted into the hollow cavity of the upper reinforcement rod and is in interference fit with the hollow cavity.

8. The transfer robot according to claim 1, wherein:

the lifting mechanism comprises a mounting seat, a lifting drive unit, and a lifting transmission assembly, the lifting drive unit and the lifting transmission assembly being on the mounting seat;

the lifting drive unit drives the lifting transmission assembly to transmissively cooperate with the auxiliary transmission member, and the lifting mechanism is vertically raised and lowered along the auxiliary transmission member.

9. The transfer robot according to claim 8, wherein:

the lifting transmission assembly comprises two first lifting synchronization wheels spaced apart along a height direction, and a first lifting synchronous belt wound around the two first lifting synchronization wheels, the first lifting synchronous belt being a double-sided toothed synchronous belt;

the auxiliary transmission member is a single-sided toothed synchronous belt vertically arranged on the door frame, and the first lifting synchronous belt meshes with the single-sided toothed synchronous belt; and the lifting drive unit comprises a lifting drive motor, and the lifting drive motor is configured to drive one of the two first lifting synchronization wheels to rotate around a horizontal axis.

10. The transfer robot according to claim 8, wherein:

the lifting guide assembly comprises a plurality of lifting guide wheels arranged at intervals along a vertical direction; the plurality of lifting guide wheels and the transmission assembly are on a common side of the mounting seat; the plurality of lifting guide wheels are rotatably connected to the mounting seat; and the plurality of lifting guide wheels abut against a reinforcement rod on which the auxiliary transmission member is not arranged.

11. The transfer robot according to claim 8, wherein the mounting seat comprises a first mounting plate arranged horizontally and two second mounting plates vertically arranged at both ends of the first mounting plate; the first mounting plate is connected to respective upper ends of the second mounting plates; the lifting transmission assembly is arranged on the corresponding second mounting plate; and the lifting drive unit is arranged on an upper surface of the first mounting plate.

12. The transfer robot according to claim 1, wherein the cargo box conveying mechanism comprises:

a transit plate detachably connected to the door frame;

a box retrieval assembly configured to toggle the cargo box and move the cargo box between the transit plate and the inventory container; and a telescopic assembly connected to the transit plate and the box retrieval assembly and configured to drive the box retrieval assembly to extend and retract horizontally relative to the transit plate, wherein:

the telescopic assembly is a two-stage synchronous telescopic structure or a three-stage synchronous telescopic structure; and the telescopic assembly comprises a fixed plate, a connection plate, a telescopic plate, a telescopic transmission assembly, and a telescopic drive assembly; the fixed plate, the connection plate, and the telescopic plate are arranged in parallel; and the telescopic transmission assembly and the telescopic drive assembly drive the connection plate and the telescopic plate to extend or retract synchronously, wherein the fixed plate is perpendicularly connected to the transit plate.

13. The transfer robot according to claim 12, wherein:
the telescopic transmission assembly comprises: a first telescopic transmission assembly configured to realize horizontal extension and retraction of the connection plate relative to the fixed plate; and a second telescopic transmission assembly configured to realize horizontal extension and retraction of the telescopic plate relative to the connection plate;
the first telescopic transmission assembly comprises: two first pulleys spaced apart from each other and arranged at both ends of the fixed plate; and a first synchronous belt wound around the two first pulleys, centers of the two first pulleys being at a same height; and
the telescopic drive assembly comprises a telescopic drive motor having a horizontally arranged output shaft, and the output shaft of the telescopic drive assembly is connected to one of the two first pulleys.

14. The transfer robot according to claim 13, wherein the second telescopic transmission assembly comprises: two second pulleys arranged at both ends of the connection plate; and a second synchronous belt wound around the two second pulleys, centers of the two second pulleys being at a same height.

15. The transfer robot according to claim 13, wherein:
the telescopic assembly further comprises a telescopic synchronization transmission assembly; and
the telescopic synchronization transmission assembly comprises a third pulley fitted over the output shaft of the telescopic drive motor, a telescopic synchronization shaft, a fourth pulley fitted over the telescopic synchronization shaft, and a third synchronous belt wound around the fourth pulley and the third pulley,
wherein each of both ends of the telescopic synchronization shaft passes through one first pulley of each of two telescopic assemblies; and the fourth pulley and the third pulley are spaced apart in a vertical direction.

16. The transfer robot according to claim 13, wherein:
the telescopic assembly further comprises a telescopic guide assembly; and
the telescopic guide assembly comprises a first guide groove on an inner side of the fixed plate; a second guide groove on an inner side of the connection plate; a first guide rail on an outer side of the connection plate and slidably fitted with the first guide groove; and a second guide rail on an outer side of the telescopic plate and slidably fitted with the second guide groove.

17. The transfer robot according to claim 12, wherein:
the telescopic assembly is arranged on each of two opposite sides of the transit plate, and the telescopic assemblies are synchronously driven by a common telescopic drive assembly in cooperation with the telescopic synchronization transmission assembly;
the transit plate has a first end formed with a cargo box entry-exit port, and a second end provided with a partition plate; and
the telescopic drive assembly and the telescopic synchronization transmission assembly are on a side of the partition plate away from the cargo box entry-exit port.

18. The transfer robot according to claim 17, wherein:
a baffle is arranged on each of two opposite sides of the transit plate corresponding to the telescopic assembly, and the baffle is on an inner side of the telescopic assembly and extends along a telescopic direction of the telescopic assembly;
the baffle comprises a baffle main body and a guide plate at each of both ends of the baffle main body; and
the guide plate has a first end connected to the baffle main body, and a second end extending obliquely in a direction away from the baffle main body towards a direction close to the fixed plate, and two baffle main bodies at a same end of the transit plate exhibit an outwardly flared structure.

19. A transfer robot, comprising a movable chassis, a door frame vertically arranged on the movable chassis, a temporary storage mechanism, and a cargo box conveying mechanism,
wherein the temporary storage mechanism and the cargo box conveying mechanism are arranged on the door frame; the temporary storage mechanism has a plurality of temporary storage spaces for temporary storage of cargo boxes; and the cargo box conveying mechanism transfers the cargo boxes between the temporary storage spaces and inventory containers;
the door frame comprises a pair of support columns arranged in parallel and spaced apart from each other; the support columns are arranged vertically; and the temporary storage mechanism and the cargo box conveying mechanism are both connected to the pair of support columns;
the cargo box conveying mechanism is connected to the door frame through a lifting mechanism; the lifting mechanism is configured to drive the cargo box conveying mechanism to rise and fall vertically; and the lifting mechanism is a self-driven lifting mechanism;
the lifting mechanism comprises a mounting seat, a lifting drive unit, and a lifting transmission assembly, the lifting drive unit and the lifting transmission assembly being on the mounting seat; and
the mounting seat comprises a first mounting plate arranged horizontally and two second mounting plates vertically arranged at both ends of the first mounting plate; the first mounting plate is connected to respective upper ends of the second mounting plates; the lifting transmission assembly is arranged on the corresponding second mounting plate; and the lifting drive unit is arranged on an upper surface of the first mounting plate.

20. A transfer robot, comprising a movable chassis, a door frame vertically arranged on the movable chassis, a temporary storage mechanism, and a cargo box conveying mechanism,
wherein the temporary storage mechanism and the cargo box conveying mechanism are arranged on the door frame; the temporary storage mechanism has a plurality of temporary storage spaces for temporary storage of cargo boxes; and the cargo box conveying mechanism transfers the cargo boxes between the temporary storage spaces and inventory containers;
the door frame comprises a pair of support columns arranged in parallel and spaced apart from each other; the support columns are arranged vertically; and the temporary storage mechanism and the cargo box conveying mechanism are both connected to the pair of support columns;
the cargo box conveying mechanism is connected to the door frame through a lifting mechanism; the lifting mechanism is configured to drive the cargo box conveying mechanism to rise and fall vertically; and the lifting mechanism is a self-driven lifting mechanism;

wherein the cargo box conveying mechanism comprises a telescopic assembly; the telescopic assembly comprises a telescopic drive assembly;

the telescopic drive assembly comprises a telescopic drive motor having a horizontally arranged output shaft, and the output shaft of the telescopic drive assembly is connected to one of the two first pulleys;

the telescopic assembly further comprises a telescopic synchronization transmission assembly; and the telescopic synchronization transmission assembly comprises a third pulley fitted over the output shaft of the telescopic drive motor, a telescopic synchronization shaft, a fourth pulley fitted over the telescopic synchronization shaft, and a third synchronous belt wound around the fourth pulley and the third pulley, wherein each of both ends of the telescopic synchronization shaft passes through one first pulley of each of two telescopic assemblies; and the fourth pulley and the third pulley are spaced apart in a vertical direction.

\* \* \* \* \*